(12) United States Patent
Krah et al.

(10) Patent No.: US 9,310,923 B2
(45) Date of Patent: Apr. 12, 2016

(54) INPUT DEVICE FOR TOUCH SENSITIVE DEVICES

(75) Inventors: Christoph H. Krah, Los Altos, CA (US); Shahrooz Shahparnia, Campbell, CA (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,973

(22) Filed: Jul. 27, 2012

(65) Prior Publication Data

US 2014/0028577 A1    Jan. 30, 2014

(51) Int. Cl.
| | |
|---|---|
| G09G 5/00 | (2006.01) |
| G06F 3/041 | (2006.01) |
| G06F 3/044 | (2006.01) |
| G06F 3/0354 | (2013.01) |
| G06F 3/045 | (2006.01) |

(52) U.S. Cl.
CPC .......... *G06F 3/0416* (2013.01); *G06F 3/03545* (2013.01); *G06F 3/041* (2013.01); *G06F 3/044* (2013.01); *G06F 3/045* (2013.01)

(58) Field of Classification Search
CPC ......... G06F 3/041; G06F 3/045; G06F 3/044; G06F 3/0416; G09G 5/00
USPC ................................................. 345/173, 174
See application file for complete search history.

(56) References Cited

U.S. PATENT DOCUMENTS

| | | |
|---|---|---|
| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday |
| 4,490,607 A | 12/1984 | Pease et al. |

(Continued)

FOREIGN PATENT DOCUMENTS

| | | |
|---|---|---|
| CN | 1243282 A | 2/2000 |
| CN | 1278348 A | 12/2000 |

(Continued)

OTHER PUBLICATIONS

Final Office Action mailed Jan. 13, 2014, for U.S. Appl. No. 12/568,316, filed Sep. 28, 2009, 15 pages.

(Continued)

*Primary Examiner* — Fred Tzeng
(74) *Attorney, Agent, or Firm* — Morrison & Foerster LLP

(57) ABSTRACT

A method for receiving data from an input device to a computing device through a touch interface. The method includes detecting an input device, synchronizing with the input device by receiving a position signal and activating an input device scan of the touch interface, receiving a data signal from the input device through at least one of a sense line or a drive line of the touch interface, and scanning the touch interface for a touch input by applying a stimulation signal to the at least one drive line and analyzing the at least one sense line.

19 Claims, 11 Drawing Sheets

(56) References Cited

U.S. PATENT DOCUMENTS

| | | |
|---|---|---|
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Casewell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |

(56) References Cited

U.S. PATENT DOCUMENTS

| | | |
|---|---|---|
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,754,472 B1 | 6/2004 | Williams et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |
| 8,537,126 B2 | 9/2013 | Yousefpor et al. |
| 8,552,986 B2 | 10/2013 | Wong et al. |
| 8,605,045 B2 | 12/2013 | Mamba et al. |
| 8,659,556 B2 | 2/2014 | Wilson |
| 8,698,769 B2 | 4/2014 | Coulson et al. |

(56) References Cited

U.S. PATENT DOCUMENTS

| | | |
|---|---|---|
| 8,847,899 B2 | 9/2014 | Washburn et al. |
| 8,928,635 B2 | 1/2015 | Harley et al. |
| 9,170,681 B2 | 10/2015 | Huang et al. |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0217064 A1 | 9/2006 | Glass et al. |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1* | 6/2007 | Errico .................. G06F 3/03547 345/174 |
| 2007/0216905 A1 | 9/2007 | Han et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | Abileah et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0142280 A1 | 6/2008 | Yamamoto et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0242346 A1 | 10/2008 | Rofougaran et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0140986 A1 | 6/2009 | Karkkainen et al. |
| 2009/0153152 A1 | 6/2009 | Maharyta et al. |
| 2009/0153525 A1 | 6/2009 | Chang |
| 2009/0167728 A1 | 7/2009 | Geaghan et al. |
| 2009/0184939 A1 | 7/2009 | Wohlstadter et al. |
| 2009/0189867 A1* | 7/2009 | Krah ...................... G06F 3/044 345/173 |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |

(56) References Cited

U.S. PATENT DOCUMENTS

| | | |
|---|---|---|
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0155153 A1 | 6/2010 | Zachut |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0315384 A1 | 12/2010 | Hargreaves et al. |
| 2010/0315394 A1 | 12/2010 | Katoh et al. |
| 2010/0321320 A1* | 12/2010 | Hung .................. G06F 3/041 345/173 |
| 2010/0327882 A1 | 12/2010 | Shahparnia et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0118030 A1 | 5/2011 | Walley et al. |
| 2011/0155479 A1 | 6/2011 | Oda et al. |
| 2011/0169771 A1 | 7/2011 | Fujioka et al. |
| 2011/0175834 A1 | 7/2011 | Han et al. |
| 2011/0216016 A1* | 9/2011 | Rosener ................. G06F 3/041 345/173 |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304583 A1 | 12/2011 | Kruglick |
| 2011/0304592 A1 | 12/2011 | Booth et al. |
| 2012/0013555 A1 | 1/2012 | Maeda et al. |
| 2012/0019488 A1 | 1/2012 | McCarthy |
| 2012/0050207 A1 | 3/2012 | Westhues et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105362 A1 | 5/2012 | Kremin et al. |
| 2012/0139865 A1 | 6/2012 | Krah |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2012/0331546 A1 | 12/2012 | Falkenburg |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0257793 A1 | 10/2013 | Zeliff et al. |
| 2014/0028576 A1* | 1/2014 | Shahparnia ............ G06F 3/0416 345/173 |
| 2014/0028607 A1* | 1/2014 | Tan ......................... G06F 3/044 345/174 |
| 2014/0267075 A1 | 9/2014 | Shahparnia et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 2 040 149 A2 | 3/2009 |
| EP | 2 172 834 A2 | 4/2010 |
| EP | 2 221 659 A1 | 8/2010 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 05-243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| TW | 200743986 A | 12/2007 |
| TW | 200925944 A | 6/2009 |
| TW | 201115414 A | 5/2011 |
| TW | 201118682 A1 | 6/2011 |
| TW | 201419103 A | 5/2014 |
| TW | 201504874 A | 2/2015 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |

(56) References Cited

FOREIGN PATENT DOCUMENTS

| WO | WO-2006/104214 A1 | 10/2006 |
|---|---|---|
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2009/105115 A2 | 8/2009 |
| WO | WO-2011/008533 A2 | 1/2011 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569 A2 | 3/2013 |
| WO | WO-2012/177569 A3 | 3/2013 |
| WO | WO-2014/018233 A1 | 1/2014 |
| WO | WO-2014/143430 A1 | 9/2014 |
| WO | WO-2015/017196 A1 | 2/2015 |

OTHER PUBLICATIONS

Non-Final Office Action mailed Sep. 18, 2013, for U.S. Appl. No. 13/652,007, filed Oct. 15, 2012, 16 pages.
Non-Final Office Action mailed Dec. 16, 2013, for U.S. Appl. No. 13/166,711, filed Jun. 22, 2011, 12 pages.
Non-Final Office Action mailed Feb. 27, 2014, for U.S. Appl. No. 11/977,279, filed Oct. 24, 2007, 11 pages.
Non-Final Office Action mailed Mar. 14, 2014, for U.S. Appl. No. 11/977,339, filed Oct. 24, 2007, 10 pages.
Notice of Allowance mailed Feb. 3, 2014, for U.S. Appl. No. 13/166,726, filed Jun. 22, 2011, nine pages.
Final Office Action mailed May 4, 2015, for U.S. Appl. No. 13/166,699, filed Jun. 22, 2011, 17 pages.
Non-Final Office Action mailed Jan. 30, 2015, for U.S. Appl. No. 13/166,711, filed Jun. 22, 2011, 12 pages.
Non-Final Office Action mailed May 14, 2015, for U.S. Appl. No. 13/560,963, filed Jul. 27, 2012, twelve pages.
Non-Final Office Action mailed May 22, 2015, for U.S. Appl. No. 13/831,318, filed Mar. 14, 2013, eight pages.
Haines, L. (Mar. 23, 2005). "Japanese Enable Human Area Network," *The Register* located at http:/www.theregister.co.uk/2005/03/23/human_area_network/print.html>, last visited Jun. 30, 2009, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 7, 2013, for U.S. Appl. No. 12/960,068, filed Dec. 3, 2010, 24 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Aug. 20, 2015, for U.S. Appl. No. 13/166,711, filed Jun. 22, 2011, six pages.
Non-Final Office Action mailed Aug. 28, 2015, for U.S. Appl. No. 13/560,958, filed Jul. 27, 2012, 11 pages.
Final Office Action mailed Apr. 28, 2014, for U.S. Appl. No. 13/652,007, filed Oct. 15, 2012, 16 pages.
Final Office Action mailed Jul. 14, 2014, for U.S. Appl. No. 13/166,711, filed Jun. 22, 2011, 12 pages.
International Search Report mailed Apr. 23, 2014, for PCT Application No. PCT/US2014/013927, filed Jan. 30, 2014, four pages.

Non-Final Office Action mailed Apr. 24, 2014, for U.S. Appl. No. 13/560,958, filed Jul. 27, 2012, nine pages.
Non-Final Office Action mailed Jun. 4, 2014, for U.S. Appl. No. 13/560,963, filed Jul. 27, 2012, nine pages.
Non-Final Office Action mailed Jun. 27, 2014, for U.S. Appl. No. 13/166,699, filed Jun. 22, 2011, 13 pages.
Notice of Allowance mailed May 12, 2014, for U.S. Appl. No. 13/166,726, filed Jun. 22, 2011, nine pages.
Search Report dated Jun. 12, 2014, for ROC (Taiwan) Patent Application No. 101122110, one page.
TW Search Report dated Jul. 7, 2014, for TW Patent Application No. 1011221079, filed Jun. 20, 2012, one page.
TW Search Report dated Jul. 8, 2014, for TW Patent Application No. 101122107, filed Jun. 20, 2012, one page.
Notice of Allowance mailed Sep. 4, 2014, for U.S. Appl. No. 13/166,726, filed Jun. 22, 2011, nine pages.
Chinese Search Report dated Sep. 6, 2015, for CN Application No. CN 201280030349.9, with English translation, six pages.
Non-Final Office Action mailed Sep. 24, 2015, for U.S. Appl. No. 13/166,699, filed Jun. 22, 2011, 14 pages.
International Search Report mailed Oct. 30, 2014, for PCT Application No. PCT/US2014/047658, filed Jul. 22, 2014, four pages.
Abileah, A. et al. (2004). "59.3: Integrated Optical Touch Panel in a 14.1' AMLCD,"*SID '04 Digest* (Seattle) pp. 1544-1547.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Anonymous. (2002). "Biometric Smart Pen Project," located at http://www.biometricsmartpen.de/..., last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID '03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action mailed Mar. 4, 2004, for U.S. Appl. No. 10/217,798, filed Aug. 12, 2002, 17 pages.
Final Office Action mailed Jan. 21, 2005, for U.S. Appl. No. 10/329,217, filed Dec. 23, 2002, 13 pages.
Final Office Action mailed Aug. 9, 2005, for U.S. Appl. No. 10/442,433, filed May 20, 2003, six pages.
Final Office Action mailed Aug. 23, 2005, for U.S. Appl. No. 10/217,798, filed Aug. 12, 2002, 10 pages.
Final Office Action mailed Dec. 13, 2005, for U.S. Appl. No. 10/371,413, filed Feb. 20, 2003, six pages.
Final Office Action mailed May 23, 2007, for U.S. Appl. No. 11/137,753, filed May 25, 2005, 11 pages.
Final Office Action mailed Oct. 18, 2007, for U.S. Appl. No. 11/351,098, filed Feb. 8, 2006, six pages.
Final Office Action mailed Oct. 31, 2007, for U.S. Appl. No. 10/217,798, filed Aug. 12, 2002, nine pages.
Final Office Action mailed Mar. 24, 2009, for U.S. Appl. No. 11/351,098, filed Feb. 8, 2006, 10 pages.
Final Office Action mailed Feb. 10, 2011, for U.S. Appl. No. 11/901,649, filed Sep. 18, 2007, 20 pages.
Final Office Action mailed May 18, 2011, for U.S. Appl. No. 11/978,031, filed Oct. 25, 2007, 17 pages.
Final Office Action mailed Jun. 15, 2011, for U.S. Appl. No. 11/595,071, filed Nov. 8, 2006, 9 pages.
Final Office Action mailed Jun. 24, 2011, for U.S. Appl. No. 11/978,006, filed Oct. 25, 2007, 12 pages.
Final Office Action mailed Jul. 5, 2011, for U.S. Appl. No. 11/977,279, filed Oct. 24, 2007, 12 pages.
Final Office Action mailed Sep. 29, 2011, for U.S. Appl. No. 11/977,911, filed Oct. 26, 2007, 22 pages.

(56) References Cited

OTHER PUBLICATIONS

Final Office Action mailed Oct. 11, 2012, for U.S. Appl. No. 12/566,455, filed Sep. 24, 2009, 8 pages.
Final Office Action mailed Oct. 25, 2012, for U.S. Appl. No. 12/568,302, filed Sep. 28, 2009, 13 pages.
Final Office Action mailed Oct. 25, 2012, for U.S. Appl. No. 12/568,316, filed Sep. 28, 2009, 15 pages.
Final Office Action mailed Jul. 26, 2013, for U.S. Appl. No. 13/166,726, filed Jun. 22, 2011, ten pages.
Final Office Action mailed Oct. 31, 2013, for U.S. Appl. No. 13/166,699, filed Jun. 22, 2011, 13 pages.
Hong, S.J. et al. (2005). "Smart LCD Using a-Si Photo Sensor," *IMID '05 Digest* pp. 280-283.
International Preliminary Report on Patentability and Written Opinion mailed Oct. 8, 2004, for PCT Application No. PCT/US03/05300, filed Feb. 20, 2003, 15 pages.
International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002 two pages.
International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
International Search Report mailed Jan. 16, 2013, for PCT Application No. PCT/US2012/043021, filed Jun. 18, 2012, six pages.
International Search Report mailed Sep. 12, 2013, for PCT Application No. PCT/US2013/048977, filed Jul. 1, 2013, six pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmany Catholic University, Budapest, Hungary 122 pages.
Non-Final Office Action mailed Jun. 4, 2003, for U.S. Appl. No. 10/217,798, filed Aug. 12, 2002, 16 pages.
Non-Final Office Action mailed May 21, 2004, for U.S. Appl. No. 10/329,217, filed Dec. 23, 2002, 13 pages.
Non-Final Office Action mailed Sep. 21, 2004, for U.S. Appl. No. 10/442,433, filed May 20, 2003, six pages.
Non-Final Office Action mailed Nov. 26, 2004, for U.S. Appl. No. 10/307,106, filed Nov. 27, 2002, eight pages.
Non-Final Office Action mailed Dec. 10, 2004, for U.S. Appl. No. 10/217,798, filed Aug. 12, 2002, nine pages.
Non-Final Office Action mailed Jan. 21, 2005, for U.S. Appl. No. 10/347,149, filed Jan. 17, 2003, nine pages.
Non-Final Office Action mailed Apr. 15, 2005, for U.S. Appl. No. 10/371,413, filed Feb. 20, 2003, four pages.
Non-Final Office Action mailed Jun. 22, 2005, for U.S. Appl. No. 10/739,455, filed Dec. 17, 2003, 10 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, seven pages.
Non-Final Office Action mailed Aug. 28, 2006, for U.S. Appl. No. 10/371,413, filed Feb. 20, 2003, six pages.
Non-Final Office Action mailed Jun. 28, 2007, for U.S. Appl. No. 11/351,098, filed Feb. 8, 2006, 12 pages.
Non-Final Office Action mailed Jun. 29, 2007, for U.S. Appl. No. 10/217,798, filed Aug. 12, 2002, 10 pages.
Non-Final Office Action mailed Feb. 25, 2008, for U.S. Appl. No. 11/137,753, filed May 25, 2005, 15 pages.
Non-Final Office Action mailed Jun. 24, 2008, for U.S. Appl. No. 11/351,098, filed Feb. 8, 2006, 11 pages.
Non-Final Office Action mailed Jun. 25, 2009, for U.S. Appl. No. 11/980,029, filed Oct. 29, 2007, 9 pages.
Non-Final Office Action mailed Nov. 23, 2009, for U.S. Appl. No. 11/407,545, filed Apr. 19, 2006, five pages.
Non-Final Office Action mailed Jul. 29, 2010, for U.S. Appl. No. 11/901,649, filed Sep. 18, 2007, 20 pages.
Non-Final Office Action mailed Oct. 13, 2010, for U.S. Appl. No. 11/978,006, filed Oct. 25, 2007, eight pages.
Non-Final Office Action mailed Oct. 14, 2010, for U.S. Appl. No. 11/595,071, filed Nov. 8, 2006, seven pages.
Non-Final Office Action mailed Nov. 26, 2010, for U.S. Appl. No. 11/977,279, filed Oct. 24, 2007, nine pages.
Non-Final Office Action mailed Nov. 26, 2010, for U.S. Appl. No. 11/977,830, filed Oct. 26, 2007, seven pages.
Non-Final Office Action mailed Dec. 13, 2010, for U.S. Appl. No. 11/977,339, filed Oct. 24, 2007, eight pages.
Non-Final Office Action mailed Feb. 1, 2011, for U.S. Appl. No. 11/978,031, filed Oct. 25, 2007, 18 pages.
Non-Final Office Action mailed Apr. 29, 2011, for U.S. Appl. No. 11/977,911, filed Oct. 26, 2007, 19 pages.
Non-Final Office Action mailed Jun. 21, 2011, for U.S. Appl. No. 11/977,339, filed Oct. 24, 2007, 10 pages.
Non-Final Office Action mailed Jun. 28, 2011, for U.S. Appl. No. 12/852,883, filed Aug. 8, 2010, 16 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Non-Final Office Action mailed Nov. 17, 2011, for U.S. Appl. No. 11/977,339, filed Oct. 24, 2007, nine pages.
Non-Final Office Action mailed Jan. 10, 2012, for U.S. Appl. No. 11/977,864, filed Oct. 26, 2007, six pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, seven pages.
Non-Final Office Action mailed Nov. 15, 2012, for U.S. Appl. No. 12/566,477, filed Sep. 24, 2009, 11 pages.
Non-Final Office Action mailed Mar. 5, 2013, for U.S. Appl. No. 13/166,726, filed Jun. 22, 2011, 14 pages.
Non-Final Office Action mailed Mar. 29, 2013, for U.S. Appl. No. 13/166,699, filed Jun. 22, 2011, 12 pages.
Non-Final Office Action mailed Jun. 17, 2013, for U.S. Appl. No. 13/166,711, filed Jun. 22, 2011, 8 pages.
Notification of Reasons for Rejection mailed Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708 filed Nov. 14, 2005, by den Boer et al.
U.S. Appl. No. 60/821,325, filed Aug. 3, 2006, by Abileah et al.

(56) References Cited

OTHER PUBLICATIONS

Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.

Chinese Search Report dated Oct. 23, 2015, for CN Application No. CN 201280030351.6, with English translation, four pages.

TW Search Report dated Nov. 20, 2015, for TW Patent Application No. 103126285, one page.

Final Office Action mailed Dec. 2, 2014, for U.S. Appl. No. 13/560,963, filed Jul. 27, 2012, ten pages.

Final Office Action mailed Dec. 16, 2014, for U.S. Appl. No. 13/560,958, filed Jul. 27, 2012, 12 pages.

\* cited by examiner

INPUT DEVICE FOR TOUCH SENSITIVE DEVICES

CROSS REFERENCE TO RELATED APPLICATIONS

This application is related to U.S. patent application Ser. No. 12/960,068 filed Dec. 3, 2010, entitled "Touch Device Communication," which is hereby incorporated by reference in its entirety.

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface. In general, touch screens can receive a touch event and a position of the touch event on the touch sensor panel, and the computing system can then interpret the touch event in accordance with the display appearing at the time of the touch event, and thereafter can perform one or more actions based on the touch event.

Some capacitive-sense touch sensors can be formed from a matrix of row and column traces, capacitive sense elements or nodes present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest.

In some instances it may be desirable for input devices, such as styli, to be able to transfer data, in addition to the touch location data, to the touch screen. For example, a stylus may have a finer tip than a user's finger and may be better able to transmit fine characters or symbols (such as those used in handwriting) better than a user's fingers. Additionally, using different input devices with a touch screen may allow an enhanced user experience, as data from the input devices (such as force, angle or tilt, or the like) may be communicated to the touch screen, which may use that data to change an output of the display or the like. However, in many instances, data communication between input devices and touch screens may require each of the input devices to be a slave to the touch screen, which may require a significant amount of power as the input devices may have to continuously listen to signals from the touch screen in order to start transmission in the correct window of time, to avoid colliding or otherwise interfering with the touch screen scan for touch inputs, such as from a user's fingers.

SUMMARY

A first example of the present disclosure may take the form of a computing device configured to communicate with an input device. The computing device includes a processor and a touch interface in communication with the processor. The touch interface is configured to detect an input signal corresponding to an object approaching or contacting a surface and includes a plurality of sensing lines and a plurality of driving lines. The touch interface is configured to conduct a touch scan and an input device scan. During the touch scan the touch interface drives at least one of the plurality of driving lines and scans the sensing lines. During the input device scan the touch interface scans at least one of the plurality of sensing lines and/or at least one of the plurality of driving lines, and while receiving a data signal from the input device, the touch interface interleaves the touch scan and the input device scan.

A second example of the disclosure may take the form of a method for a computing device to receive data from an input device through a touch interface. The method includes detecting an input device, synchronizing the touch interface with the input device by receiving a position signal and activating an input device scan of the touch interface, receiving a data signal from the input device through at least one of a sense line or a drive line of the touch interface, and scanning the touch interface for a touch input by applying a stimulation signal to the at least one drive line and analyzing the at least one sense line.

A third example of the disclosure may take the form of a method for transmitting data from an input device to a capacitive sensing grid of a computing device. The method includes receiving a user input, transitioning from an idle state to an active state when the user input exceeds a predetermined threshold, transmitting data to the capacitive sensing grid through a tip of the input device, and if a previous data transmission was longer than a predetermined time period, extending a time period for the data transmission.

A fourth example of the disclosure may take the form of a system for receiving and transmitting multi-frequency signals. The system may include an input device, such as a stylus, and a touch screen interface. The stylus may transmit one or more signals using two or more frequencies and the touch screen may select a particular frequency for receiving the one or more signals. The touch screen may select the particular frequency by determining the frequency that may be received most clearly, that is, the frequency that may be less affected by noise sources. The cleanest or clearest frequency may be selected using a spectrum analyzer or may be selected using a majorities rules or a medium algorithm. For example, the touch screen may analyze the at least two frequencies and determine the two closest results.

SPECIFICATION

Overview

Figure 1:
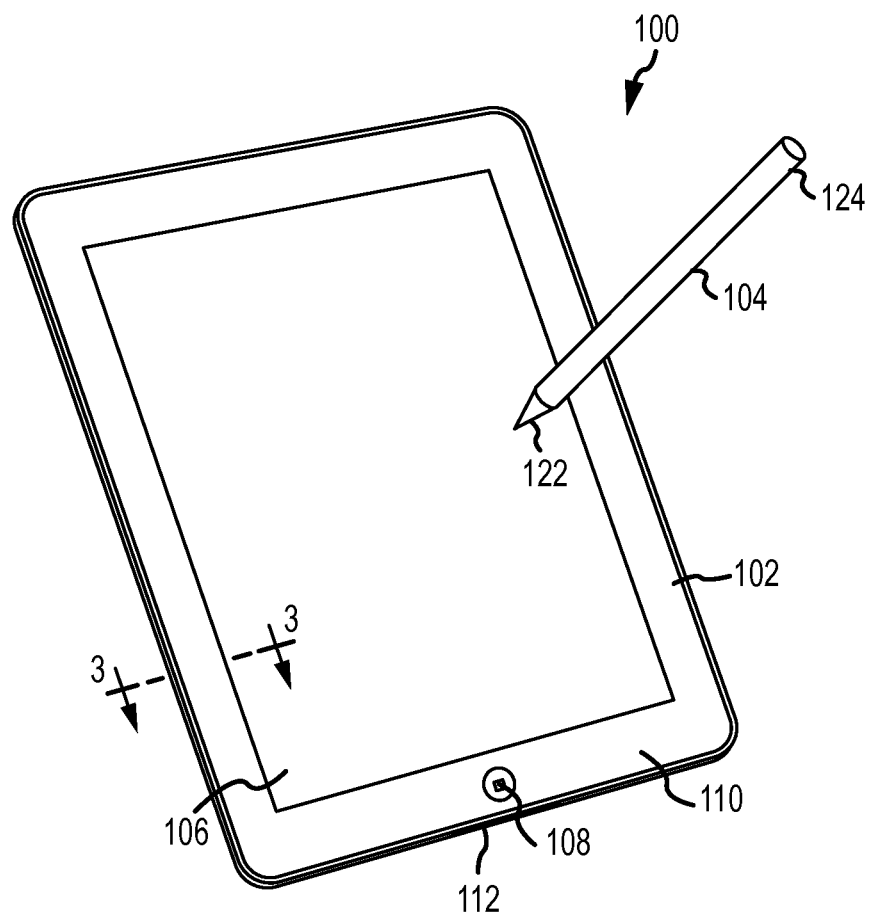
FIG. 1 is a perspective view of a system including a computing device and an input device configured to provide input data to the computing device.

In some embodiments herein, an input device and methods for transmitting data from the input device through a capacitive coupling or touch screen interface are disclosed. In one embodiment, the input device, which may be a peripheral device, such a stylus, may transmit data to the touch screen without requiring the input device to send an activation signal or otherwise "sniff" the touch screen to indicate that data is about to be transferred. In other words, the input device may not have to determine a communication window in which the touch screen may be ready to receive data from the input device. Rather, the stylus may be the "master" and the touch screen may be the "slave," which may allow the stylus to transmit data as desired, which may result in a faster transmission of data between the two devices, and may not require the touch screen to provide feedback to the input device. Specifically, the methods described herein may allow bi-directional or single direction communication between the input device and the touch screen. For example, the input device may unilaterally communicate with the touch screen or the touch screen may also transmit data to the input device, thereby creating a two-way communication channel.

In embodiments where the stylus may not receive a synchronization signal from a touch screen, the input device may consume less power than other types of input devices. This is because the input device of the present disclosure may not require a receiver configured to receive an activation signal from the touch screen, and thus may include one less component that may require power. Further, as the input device may be the master between the two devices, the input device may not have to modify its data transmission when transferring data to, or receiving data from, the touch screen. This may also require less power than other similar types of input devices that may have to vary their data transmission to accommodate a receiving device.

In one embodiment, the touch screen may include a search operation to search for the input device. As one example, the touch screen may use spectral analysis to search for an input device frequency indicating that the input device is ready to transmit information (or is transmitting information). Alternatively or additionally, the touch screen may use a search scan (along columns or rows of the touch screen) to detect the input device. The touch screen may interleave touch scanning (e.g., capacitive scanning of rows and/or columns) between the input device search operations. As an example, the touch screen may scan a first set of rows (e.g., a bank of rows), then search for the input device, and repeat until the entire set of rows has been scanned. As will be discussed in more detail below, the frequency that the touch screen searches for the input device may be determined based on a desired or acceptable latency or lack thereof. For example, fewer input device searches interleaved between touch scans may require additional scanning time prior to the input device being detected, alternatively, more input device searches may reduce the time it takes for a touch to be detected, but may increase the user perceived response or output time of the input device.

Continuing with this embodiment, once the input device is detected, the touch screen may interleave touch scanning with input device or data scanning. In this manner, the touch screen may continue to detect any touches or inputs other than the input device, as well as detecting data from the input device. In many embodiments, the input device may transfer data sufficiently fast such that the touch screen may scan all rows of a touch screen grid, while interleaving receiving data from the input device.

The touch screen may receive a variety of data from the input device. As some examples, the input device may transfer data from one or more sensors (e.g., force sensors, tilt sensors), as well as position information (orientation and position relative to the touch screen), power data (e.g., battery level), as well as substantially any other type of data which may be desired to be transmitted between the input device and the touch screen. As one example, the input device may transfer a force that a user may be exerting on a tip of the input device, which may indicate the pressure a user may be applying to the touch screen with the input device.

In some embodiments, the input device may include additional data transfer mechanisms. For example, in embodiments where the input device is a stylus, the stylus may include an output mechanism such as an eraser electrode, which may be used to "erase" previous inputs from the stylus. As another example, which may be separate from or in addition to the eraser, the input device may include a tilt input mechanism. The tilt mechanism may vary an input signal to the touch panel to indicate an angle of the input device relative to the touch screen. For example, the tilt mechanism may indicate whether the input device is oriented perpendicular, parallel, or some angle in between relative to the touch screen.

DETAILED DESCRIPTION

Turning now to the figures, a communication system including a computing device and an input device will be discussed in more detail. FIG. 1 is a perspective view of an input system 100 including an input device 104 in communication with a computing device 102 by a touch screen 106. The computing device 102 may be substantially any type of electronic device including a capacitive input mechanism, such as the touch screen 106 or other touch interface. For example, the computing device 102 may be a laptop computer, a tablet computer, a smart phone, a digital music player, portable gaming station, or the like. Although not shown, the computing device 102 may include one or more components of a typical electronic or computing device, such as a processor, to provide control or provide other functions for the device 102. Some illustrative components for operating and communicating with the touch screen 106 are discussed in more detail below with respect to FIG. 4.

The computing device 102 may include the touch screen 106, an enclosure 110, and/or one or more input buttons 108. The enclosure 110 encloses one or more components of the computing device 102, as well as may surround and/or secure a portion of the touch screen 106 to the computing device 102. The one or more input buttons 108 may provide input functions to the computing device 102. For example, the input buttons 108 may adjust a volume for the computing device 102, turn the computing device 102 on or off, or may provide other inputs for the computing device 102. Further, the computing device 100 may also include one or more receiving ports 112. The receiving ports 112 may receive one or more plugs or connectors, such as but not limited to, a universal serial bus (USB) cable, a tip ring sleeve connector, or the like.

The touch screen 106 may include one or more sensors in order to detect one or more input or location signals. Additionally, the touch screen 106 may include a display screen to provide a graphical user interface, and other video and/or image output for the computing device 102. The touch screen 106 and other components of the computing device 102 will be discussed in more detail below.

Figure 2:
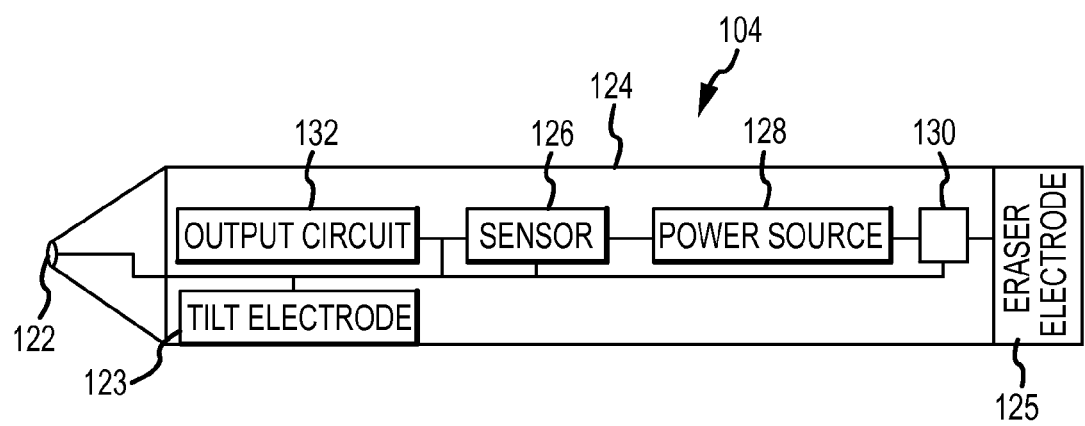
FIG. 2 is an exemplary block diagram of the input device of FIG. 1.

Turning to FIG. 2, the input device 104 will be discussed in more detail. The input device 104 may be configured to be in communication with the computing device 102, specifically through the touch screen 106, discussed in more detail below. FIG. 2 is an exemplary block diagram of the input device 104. With reference to FIGS. 1 and 2, in some embodiments, the input device 104 may be in the form a stylus, and may have a generally elongated main body 124 with a tip 122 at a first end. The tip 122 may be configured to be traced along the touch screen 106. For example, the tip 122 may be a generally resilient material which may deform upon pressure, and can slide along the surface of the touch screen 106. In other embodiments, the tip 122 may be a harder material shaped as a ball and roll along the surface.

The tip 122 may be a conductive material, or another material laced with a conductive material, in order to interact with the touch screen 106 and specifically one or more electrode layers (as discussed below) to provide input to the computing device 102. It should be noted that in some embodiments, the input device may include a non-conductive but relatively thin coating that may cover a portion, if not all, of the tip. The non-conductive coating may be sufficiently thin to allow electrical communication therethrough. Additionally, the tip 122 may be configured to transmit one or more signals, such as voltage signals, to the touch screen 106. For example, the tip 122 may be communicatively coupled to a power source 128, which may provide one or more voltages to the tip 122 to transmit to the touch screen 106. In one embodiment, the tip 122 may act as an electrode that may interact with the touch screen to stimulate an electric field. The tip 122 may be made of metals such as aluminum, brass or steel, as well as conductive rubber, plastic or other materials doped with conductive particles.

With continued reference to FIG. 2, the input device 104 may also include one more sensors 126. In some instances the sensors 126 may be configured to detect one more stimuli at the tip 122, the body 124, and/or other areas of the input device 104. For example, the one more sensors 126 may include an accelerometer, a gyroscope, a pressure or force sensor, and so on. In these instances, the sensors 128 may be configured to detect changes in the angle a user may hold the input device 104, a force that the user presses the tip 122 against the touch screen 106, an acceleration of the tip 122 along the touch screen 106, and so on. In some embodiments, the sensor 126 may act place the input device 104 in an active state. In some embodiments the sensor 126 may provide a signal in response to a sensed parameter, which may be provided to a processor to activate the input device 104. For example, the sensor 126 may be a force sensor that may activate the input device 104 when a user applies a force on the input device 104 (e.g., by squeezing the body 124, pressing the tip 122 to the touch surface, or the like). Examples of activating or placing the input device into a wake mode using the one or more sensors is discussed in more detail below with respect to FIG. 5. It should be noted that the power source 128 may further provide power to the one or more sensors 128, as necessary or desired.

The input device 104 may include one or more interacting components, such as electrodes, that may interact with the touch screen 106. In some embodiments, the input device 104 may include a tilt electrode 123 and an eraser electrode 125. These two electrodes 123, 125, which will be discussed in more detail below, may interact with the touch screen by varying one or more signals, thereby indicating a position of the input device 104. For example, during normal use the eraser electrode 125 may be sufficiently separated from the touch screen 106 to be prevented from interacting therewith. In this example, if the user switches the orientation of the input device 104 so that the end with the eraser electrode 125 is positioned on or adjacent to the touch screen 106, the touch screen may sense the electrode 125 and thus determine the orientation change in the input device 104. As will be discussed in more detail below, the touch screen may differentiate between the tip 122 and the eraser electrode 125, as the eraser electrode 125 may transmit signals that may be phase shifted 180 degrees (or by some other amount) from the signals from the tip 122.

Similarly, the tilt electrode 123 may be arranged along a portion of the body 124 of the input device 104, and depending on the angle that the user may be holding the input device 104 adjacent the touch screen 106, the tilt electrode 123 may interact more or less strongly with the touch screen 106. For example, if the input device 104 is positioned so that the body 124 is perpendicular to the touch screen 106, the tilt electrode 123 may be sufficiently separated from the touch screen 106 and may not interact therewith, versus if the user tilts the input device 104 in a particular range, the tilt electrode 123 may communicate with the touch screen 106.

The eraser electrode 125 and the tilt electrode 123 may be formed of a conductive material, or a material sufficiently laced with conductive particles to be conductive. In some embodiments, the eraser electrode and/or the tilt electrode may be substantially similar to the tip. In other embodiments, the input device may include other interacting/output mechanisms. As defined herein, the term electrode is meant to encompass substantially any type of conductive component, and as such the input device electrodes may be generally conductive materials in communication with one or more components of the input device and/or touch screen.

The input device 104 may also include one or more processing components to control select functions of the input device 104. For example, the input device may include a processor 130 that may control certain functions of the sensors 128. In some embodiments, the processor 130 may determine one or more input signals that may be transmitted through the tip 122 to the touch screen 106 and/or computing device 102. Moreover, as discussed in more detail with respect to FIGS. 8A and 9A, depending on the desired format of the data transfer between the input device and the touch screen, the input device may include other components, such as amplifiers, signal boosters, modulators, or the like.

Optionally, the input device 104 may also include an output circuitry or interface 132. The output interface 132 may receive and/or transmit one or more signals to and from the input device 104. For example, the output interface 132 may receive one or more radio signals (e.g., Bluetooth), or may be configured to receive one or more electrical (digital and/or analog) signals transmitted from the computing device 102. In the latter example, the output interface 132 may be used in conjunction with or instead of the tip 122 to transmit and/or receive signals from the touch screen 106. For example, the output interface 132 may be configured to receive one or more voltage signals from the touch screen 106 (e.g., through the drive lines). Additionally, the output interface 132 may include a voltage source in order transmit (optionally via the tip 122) one or more signals to the touch screen 106 and/or computing device 102.

Figure 3:
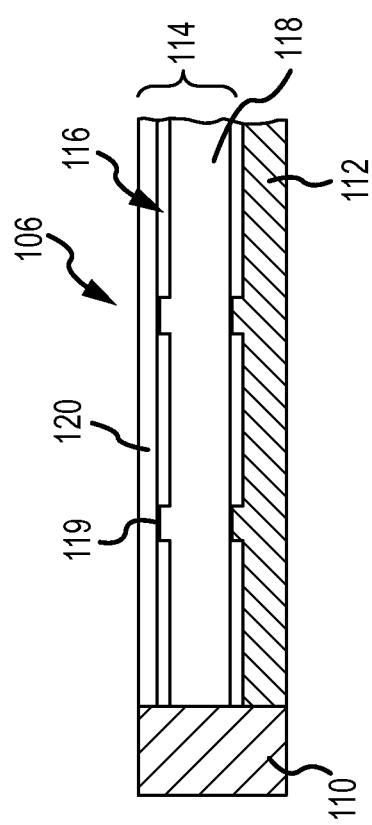
FIG. 3 is a cross-section view of a portion of a touch screen of the computing device taken along line 3-3 in FIG. 1.

The touch screen 106 will now be discussed in more detail. FIG. 3 is a cross-section view of the touch screen 106 taken along line 3-3 in FIG. 1. The touch screen 106 is configured to receive inputs from an object and to send this information to a processor. Such information may be, for example, location information based on a user's finger, location information based on an input device location, or data from the input device. The touch screen 106 may report touches to the processor 148 and the processor 148 may interpret the touches in accordance with its programming. For example, the touch screen processor 148 may initiate a task in accordance with a particular touch. The touch screen 106 may include a display screen 112 and a sensor panel 114 positioned at least partially over the display screen 112. The display screen 112 is configured to display one or more output images and/or videos for the computing device 102. The display screen 112 may be substantially any type of display mechanism, such as a liquid crystal display (LCD), plasma display, or the like. In instances where the display screen 112 is a LCD display, the display screen 112 may include (not shown) various layers such a fluorescent panel, one or more polarizing filters, a layer of liquid crystal cells, a color filter, or the like. It should be noted that FIG. 3 is not drawn to scale and is a schematic view of the touch screen. For example, in some instances there may be an air gap between the display screen 112 and the sense glass 118 and/or electrode layer.

The sensor panel 114 may include an electrode layer 116 operably connected to a sensor or cover glass 118 or other type of support structure. The electrodes 116 may be connected to one or both sides of the sensor glass 118. As one example, the electrodes 116 may be positioned on a first side of the sensor glass 118, and the other side of the glass may be coated to form a ground shield. As another example, the sensor glass 118 may be formed of multiple layers of polyethylene terephthalate (PET), with each layer including electrodes 116 operably connected to one side of the layer, and then each of the layers may be stacked to form rows, columns, and/or shield layers.

With continued reference to FIG. 3, the sensor glass 118 may form a portion of the display screen 112 or may be separate therefrom. The sensor glass 118 may be a relatively clear element that may protect the display screen 112 from forces that may be exerted on the sensor panel 114 by a user or input device. In some embodiments, the sensor glass 118 may be a clear glass panel that may allow the display screen 112 to be viewable therethrough. The electrode layer 116 may include one or more electrodes which may be deposited on the sensor glass 118. For example, the electrode layer 116 may include transparent conductive materials and pattern techniques such as ITO and printing. It should be noted that the electrode layer 116 may include a plurality of electrodes separated by gaps, where the electrodes are interconnected by one or more traces or other electrical elements.

In some embodiments, the sensor glass 118 may act as a ground shield to electronically isolate the electrode layer 116 from the display screen 112 and/or other internal components of the computing device 102 (such a processor, or electronic circuits). The electrode layer 116 may include one or two layers of electrodes which may be spaced apart across the layer 116. The electrodes, discussed in more detail with respect to FIG. 4, may define one or more nodes 144 that act as capacitive coupling sensors to detect touches on the touch screen 106. The number and configuration of the nodes 144 may be varied, depending on the desired sensitivity of the touch screen 106.

The touch screen 106 may also include a cover sheet 120 disposed over the electrode layer 116. Thus, the electrode layer 116 may be substantially sandwiched between the cover sheet 120 and the sensor glass 118. The cover sheet 120 protects the other layers of the touch screen 106, while also acting to insulate the electrode layer 116 from external elements (such as fingers or input devices that may contact the cover sheet 120). The cover sheet 120 may generally be formed from substantially any suitable clear material, such as glass or plastic. Additionally, typically the cover sheet 120 should be sufficiently thin to allow for sufficient electrode coupling between the electrode layer 118 and any external input objects (e.g., fingers, input devices). For example, the cover sheet 120 may have a thickness ranging between 0.3 to 2 mm.

It should be noted that in some embodiments, the touch screen 106 may be substantially any type of touch interface. For example, the touch interface may not be see-through and/or may not correspond to a display screen. In these instances, a particular surface or group of surfaces may be configured to receive touch inputs, that may or may not correspond to a separately displayed user interface, icons, or the like.

Figure 4:
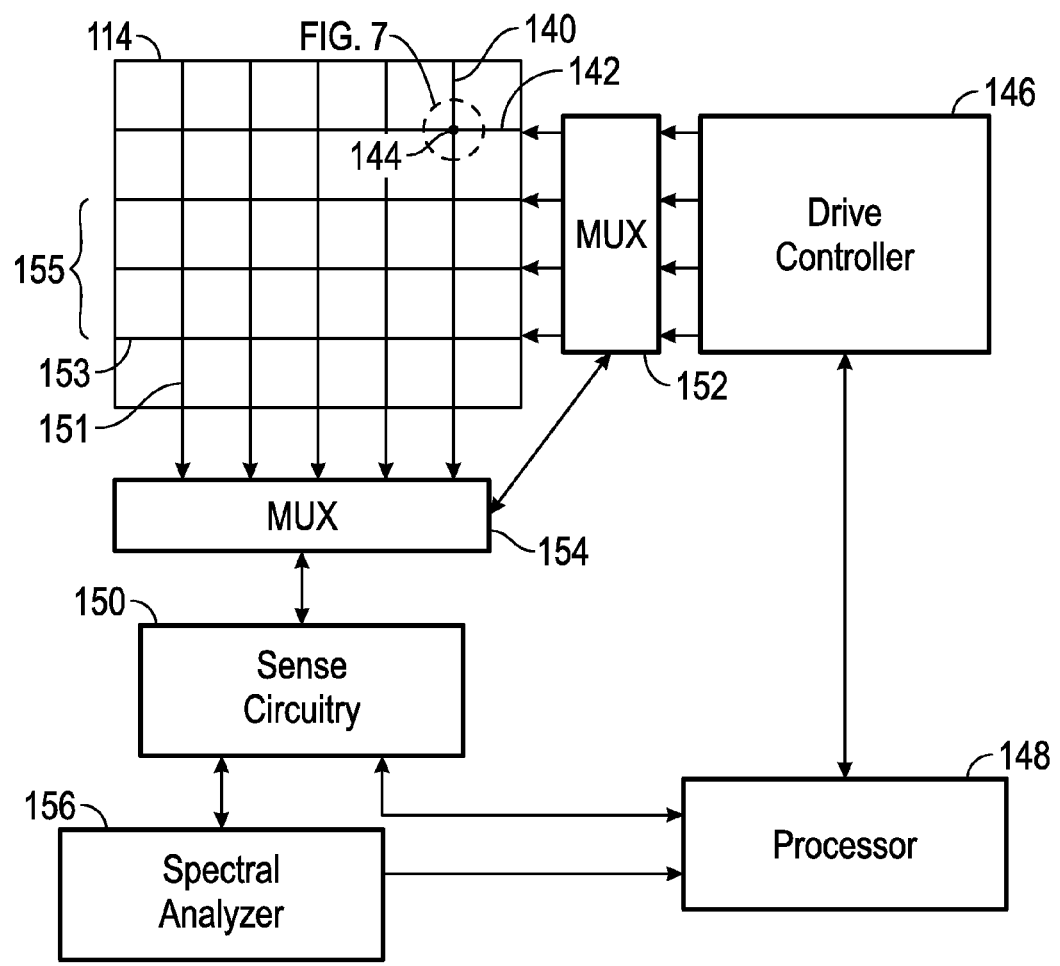
FIG. 4 is a simplified block diagram of a sample touch screen and associated circuitry.

Operation of the touch screen 106 during a touch scan will now be discussed in more detail. FIG. 4 is an illustrative block diagram of the computing device 102 and touch screen 106. The sensor panel 114 of the touch screen 106 may be configured to detect touches on the surface of the touch screen 106 by changes in capacitance. Typically when two electrically conductive members come close to one another, without actually touching, their electric fields interact to form a capacitance. With reference to FIG. 4, a sensing node 144 formed by one or more electrodes (explained below) may form a first electrically conductive member and an object, such as a finger of the user, may form a second electrically conductive member. The sensor panel 114 of the touch screen 106 may be configured as in a self capacitance arrangement or in a mutual capacitance arrangement.

In the self capacitance arrangement, the electrode layer 116 may include a single layer of a plurality of electrodes spaced in a grid or other arrangement where each electrode may form a node 144. The sensing circuit 150 monitors changes in capacitance that may occur at each node 144. These changes typically occur at a node 144 when a user places an object (e.g., finger or tip 122 of the input device 104) in close proximity to the electrode.

With continued reference to FIG. 4, in a mutual capacitance system, the electrode layer 116 may include electrodes separated into two layers forming drive lines 142 and sense lines 140. The drive lines 142 may be formed on a first layer of the electrode layer 116 and the sense lines 140 may be formed on a second layer of the electrode layer 116. The nodes 144 for the sensor panel 114 may be defined at locations of the electrode layer 116 where the drive lines 142 may cross over or under the sense lines 140 (although they are typically placed in different layers). The sense lines 140 may intersect the drive lines 142 in a variety of manners. For example, in one embodiment, the sense lines 140 are perpendicular to the drive lines 142, thus forming nodes 144 with x and y coordinates. However, other coordinate systems can also be used, and the coordinates of the nodes 144 may be differently defined.

A drive controller 146 is connected to each of the drive lines 142. The drive controller 146 provides a stimulation signal (e.g., voltage) to the drive lines 142. The sensing circuit 150 is connected to each of the sense lines 140 and the sensing circuit 150 acts to detect changes in capacitance at the nodes 144. During operation, the stimulation signal is applied to the drive lines 142 and due to the capacitive coupling between the drive lines 142 and sensing rows 140, a current is carried through to the sense lines 140 at each of the nodes 144. The sensing circuit 150 then monitors changes in capacitance at each of the nodes 144. As with the self-capacitance, a change in capacitance at each of the nodes 144 typically occurs when a user places an object such as a finger in close proximity to the node 144 as the object typically steals a charge, affecting the capacitance of the node 144.

In a specific embodiment, each drive line 140 may be driven separately, such that the drive controller 146 may selectively apply the stimulation signal to each row 153 or banks (groups) or rows of drive lines 142. Each drive line 140 may be driven sequentially until the entire set of drive lines 142 has been driven. In some embodiments, the drive lines 142 may be driven in banks 155 or groups. For example, a certain number of rows 153 may form a bank 155, and each row 153 in the bank 155 may be driven together. Although the drive lines 142 are driven individually (or in groups) the sensing circuit 150 may sense changes of capacitance along all of the sense lines 140 in parallel. In other words, each column 151 of sense lines 140 may be sensed substantially simultaneously. It should also be noted that, in some instances, a stimulation signal may be applied to the electrode layer 116 by the input device 104, rather than, or in addition to the drive controller 146. This will be discussed in more detail below, but briefly, the input device 104 may apply a voltage similar to the stimulation signal in order to induce a current through the sense lines 140 and the drive lines 142, and create a capacitive coupling within the electrode layer 116.

In either the self-capacitance or mutual capacitance arrangements discussed above, the sensing circuit 150 can detect changes in capacitance at each node 144. This may allow the sensing circuit 150 to determine when and where a user has touched various surfaces of the touch screen 106 with one or more objects. The sensing circuit 150 may include one more sensors for each of the sense lines 140 and may then communicate data to a processor 148. In one example, the sensing circuit 150 may convert the analog capacitive signals to digital data and then transmit the digital data to the processor 148. In other examples, the sensing circuit 150 may transmit the analog capacitance signals to the processor 148, which may then convert the data to a digital form. Further, it should be noted that the sensing circuit 150 may include individual sensors for each sensing line 142 or a single sensor for all of the sense lines 140. The sensing circuit 150 may report a location of the node 144, as well as the intensity of the capacitance (or changed thereof) at the node 144.

In some embodiments, the touch screen 106 may include one or more multiplexers. For example, during touch operation, the sensing circuit 150 may also include a multiplexer configured to perform time multiplexing for the sense lines 140. For example, the sensing circuit 150 may receive signals from each of the nodes 144 along the sense lines 140 at approximately the same time, the multiplexer stores the incoming signals and then may release the signals sequentially to the processor 148 one at a time.

In addition to the multiplexers that may be used during a touch mode to process touch signals, the touch screen 106 may also include a drive multiplexer 152 and/or a sense multiplexer 154. These two input device multiplexers 152, 154 may be in communication with the respective set of lines 140, 142, to switch been a touch mode and a stylus or input device mode. As will be discussed in more detail below, during stylus mode, the touch screen 106 may selectively scan the sense lines 140, as well as the drive lines 142, in order to receive data transmitted from the tip 122 of the input device 104. In these embodiments, the drive controller 146 may further be configured to sense for signals on the drive lines 142 in order to detect a signal transmitted from the tip 122 of the input device. In this manner, the drive lines 142 may be configured to act as sense lines 140 and interact with the tip 122 of the input device 104 to receive one or more signals (e.g., voltage signals). In other words, rather than providing a stimulation signal to the drive lines 142, during a stylus scan, if the stylus is transmitting, the stylus may apply a stimulation signal to the drive lines 142 (in the form of a data transmission signal).

In some embodiments, the drive lines 142 may be scanned after the input device has been detected by the sense lines. These embodiments may reduce the scanning time required for the touch screen to detect the input device, as the drive lines 142 may only be scanned in instances where the input device is actually present. Thus, if the input device is not detected, the touch screen may more quickly return to scanning for touch inputs. That said, it should be noted that when driving, the input device 104 may provide a stimulation signal to both the sense and drive lines simultaneously and so in some instances both lines may be scanned simultaneously. However, in some embodiments, the sense lines 140 and drive lines 142 are scanned sequentially (when the input device is detected) as this type of scanning may allow the touch screen to re-use the same touch hardware for both scanning and drive line scanning. That is, the sense circuitry may be multiplexed to the drive lines, to reduce the separate components that may be required by the touch screen.

Additionally, as will be discussed in more detail below, in some embodiments, the touch controller, such as the sense circuitry 150 and/or drive controller may analyze the input or stimulation signal transmitted from the input device in order to detect the position of the input device, as well as to receive data communication. In other words, the input signal may be used to detect location, and the same signal may be encoded with data from the input device.

Further, with continued reference to FIG. 4, the touch screen 106 may also include a spectral analyzer component 156. The spectral analyzer 156 may be configured to analyze one or more frequencies of a received signal to determine a clearest transmitting frequency. Specifically, the spectral analyzer 156 may be configured to search a spectrum of frequency to determine if a transmission frequency of the input device is detected. The spectral analyzer 156 may be in communication with one or both of the drive lines 142 or the sense lines 140.

Figure 5:
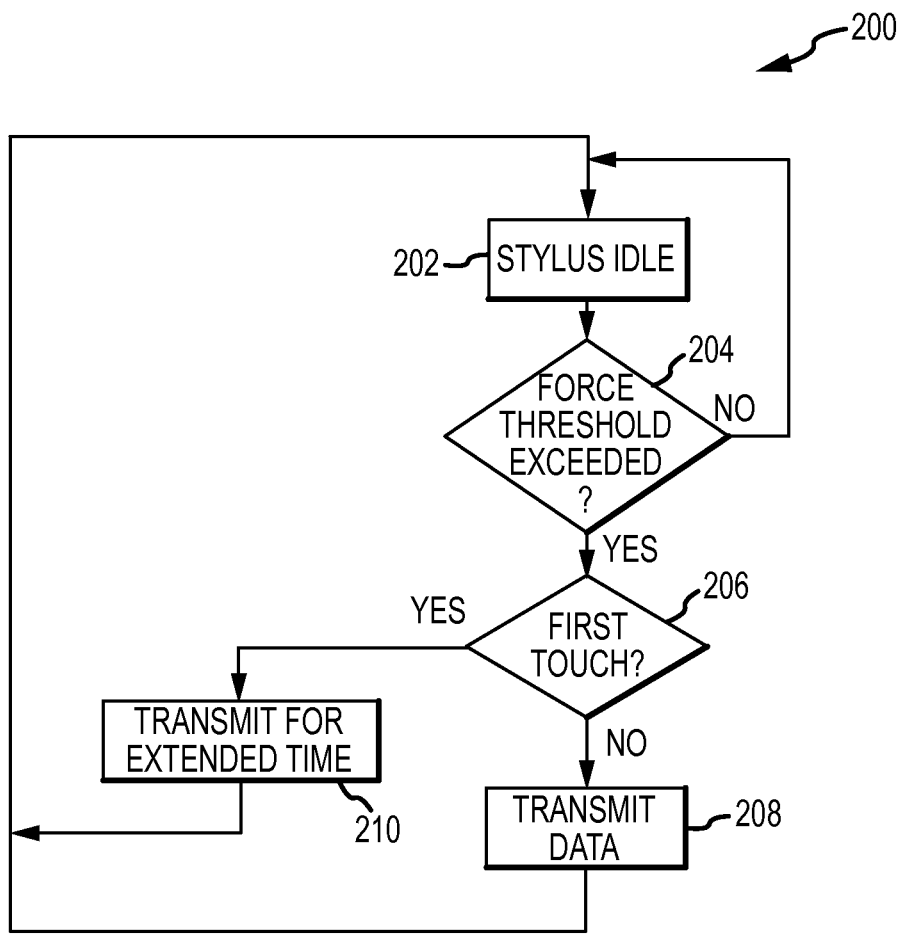
FIG. 5 is a flow chart illustrating a method for using an input device to transmit information to a touch screen.

Operation of the system 100 and the input device 104 interacting with the touch screen 106 will now be discussed in more detail. FIG. 5 is a flow chart illustrating a method 200 for using the input device 104 to transmit data to the touch screen 106. The method 200 may begin with operation 202 in which the input device 104 may be idle or in a sleep mode. After operation 202, the method 200 may proceed to operation 204. In operation 204 the processor 130 of the input device 104 may determine whether a force threshold has been exceeded or otherwise whether the input device should be activated. In one example, the processor 130 may determine whether the one or more sensors 126 has registered an input that may require the input device 104 to activate. Continuing with this example, the sensor 126 may be a force sensor and the processor 130 may determine whether an input force (if any) is sufficient to activate the input device 104. If the sensor 126 is in the body 124 of the input device 104, the processor 130 may use the force sensor to determine if a user is gripping the body in order to prepare to use the input device 104. If the sensor 126 is in or near the tip 122, the processor 130 may use the force sensor to determine if the user is pressing the input device 104 on a surface indicating that he or she may be wanting to use the input device 104. In other examples, the sensors 126 may detect other parameters that may be used to activate the input device 104, such as but not limited to, temperature (e.g., heat from a user's hand), touch (e.g., capacitive changes), light, and so on.

If the processor 130 determines that the input device 104 should not be activated, the method 200 may return to operation 202. For example, the input device 104 may have a range of values that may be sufficient to transition the input device 104 from an off state to an idle state, but may require an increased input in order to transition the input device 104 from the idle state to an active state. As a specific example, if the user lightly grasps the input device 104, a force sensor may register an initial input which may transition the input device 104 to the idle state from a sleep state (i.e., more reduced power savings state), but the grasp may not exceed the activate operation threshold. Alternatively or additionally, the processor 130 may determine to activate the input device 104 if a particular wake signal (e.g., from the sensor 126) has continued for a predetermined time period, e.g., if the user continues to grasp the input device 104 for a select time period.

It should be noted that, if the input device 104 is not activated in operation 204, the method 200 may include one or more timeouts or waiting periods prior to transitioning to the idle or sleep state. For example, if the processor 130 determines that the input device 104 is not going to be activated, the method may proceed to a timeout operation and unless the input device 104 receives an activation input or another input during the timeout period, the input device 104 may transition to the sleep or idle stage. However, if during the time out period the input device receives an input, the method 200 may return to the activate operation. Further, it should be noted that in other embodiments, the input device may be otherwise activated. For example, the input device may include a power switch which may be selectively activated manually (or otherwise) by a user. In this example, the input device may be turned on or activated automatically when the user flips the switch.

With continued reference to FIG. 5, if the input device 104 is activated in operation 204, the method 200 may proceed to operation 206. In operation 206, the processor 130 may determine whether the input device 104 may be in communication with the touch screen 106 for the first time in a set period. In other words, whether a data communication path between the input device 104 and the touch screen 106 is a newly activated one (i.e., first touch of the input device on the screen), or a recently latent communication path. For example, if the input device is a stylus, the processor 130 may distinguish between a newly initiated writing by the user on the screen and an extended pause of a continuous writing. A first touch or "new" communication path may be selected dynamically or statically and may be a time period, number of inputs, or other parameters.

If the communication is a first touch, the method 200 may proceed to operation 210. In operation 210 the input device 104 may transmit data (such as data from the sensors 126 or the like) through the tip 122 and/or other electrodes or transmission members for an extended period of time. This extended period, as will be explained in more detail below, may allow the input device 104 to be better detected by the touch screen 106 when it is first placed onto the touch screen 106, e.g., when a user first decides to use the input device to provide inputs to the touch screen 106. Generally, the touch screen may alternate touch scans with scans to detect the input device, and in "first touch" situations, the touch screen may be scanning for the input device less frequently than if the input device has previously been communicating with the touch screen. Accordingly, by increasing the transmission time of the input device during first touch situations, the touch screen may be better able to detect the input device.

Alternatively, if the communication is not a first touch (that is, the input device may have recently been used to provide inputs to the touch screen 106), the method may proceed to operation 208. In operation 208 the input device 104 may transmit data to the touch screen 106. The transmission of data to the touch screen 106, in either operations 208 or 210 may be substantially the same, but in operation 210, the signals may be broadcast for a longer time period and/or may be repeated.

Examples of data transmission from the input device 104 to the touch screen 106 will be discussed in more detail below. Briefly, however, the input device 104 may transmit data generated by, or derived from, any of the one or more sensors 126, as well as other characteristics of the input device 104. For example, the input device 104 may transmit a power level remaining (e.g., battery level), tilt or angle relative to the touch screen 106, input or user force on the input device, as well as other parameters. The type of data transferred may depend on the configuration of the input device, as well as a desired application or software executed by the touch screen. As one example, the input device may include an "eraser," where when the eraser is activated, the data may be different from non-eraser mode (e.g., the force which the user is pressing the tip on the touch screen may not need to be transferred when in eraser mode, whereas in normal mode the force of the tip may provide different types of inputs to the device).

The data signal or transmission signal from the input device 104 may be analog, digital, or a combination signal including both analog and digital characteristics. Additionally, the data signal may include two or more signals multiplexed together, e.g., time division multiplexing or frequency division multiplexing (or a combination of time and frequency division multiplexing). In these examples multiple data bits may be embedded into a single signal.

It should be noted that, in some embodiments, the input device 104 may have to drive (e.g., transmit a signal) for a period that may be sufficiently long to allow the touch screen 106 to synchronize the transmission signal for the input device 104. For example, the input device 104 may be configured to have a drive time that may be longer than the length of the touch scan and twice the length of the spectral analysis scan. Additionally, to help reduce data transmission errors, the input device 104 may also include an additional margin error buffer. In these instances, the input device 104 may transmit a data signal to allow it to be detected both along the drive lines 142 and the sense lines 140. This may help to ensure that the vertical and horizontal positions of the input device 104 may be detected during the two input device scans.

Figure 6:
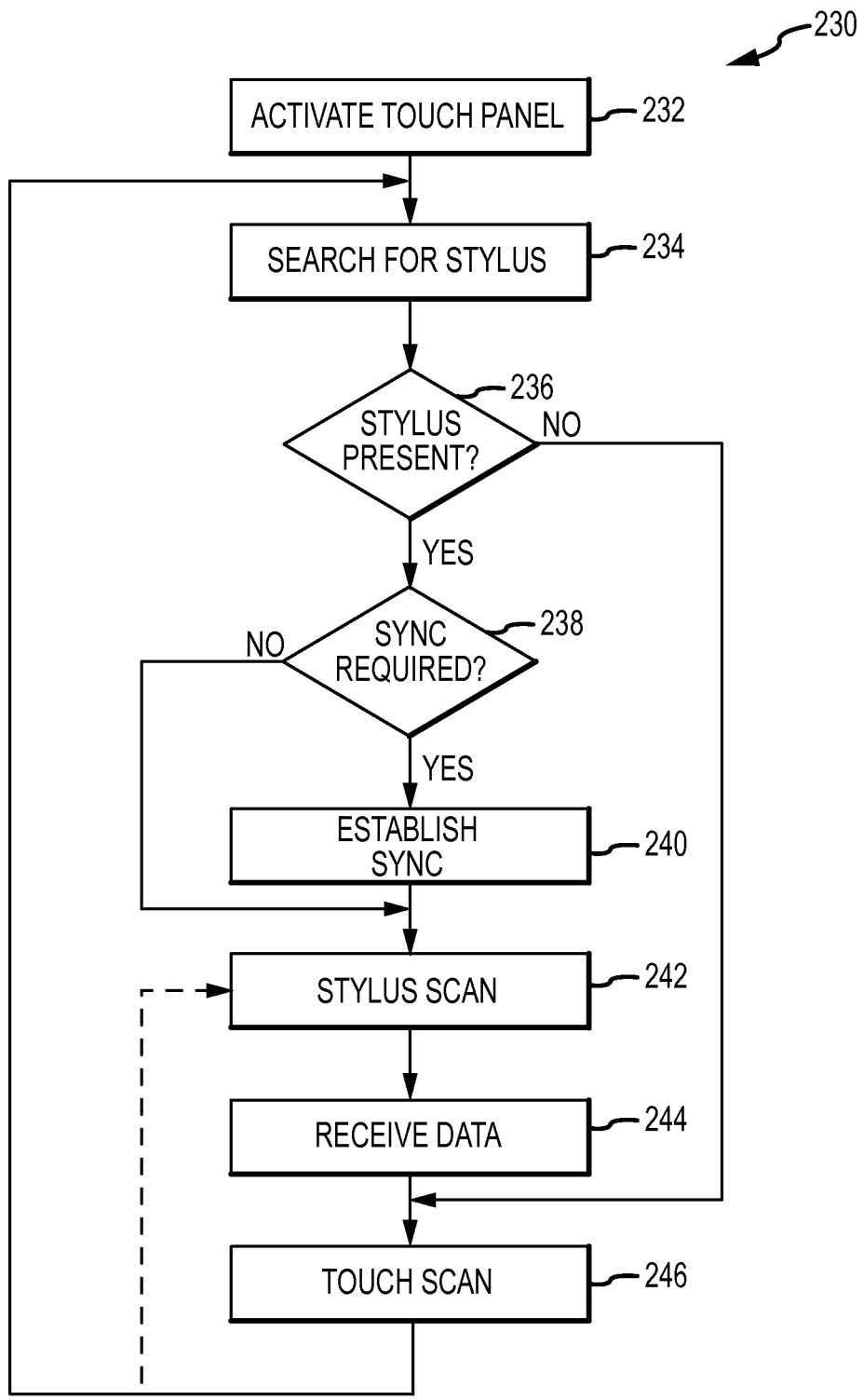
FIG. 6 is a flow chart illustrating a method for using a touch screen to receive data from an input device.

An illustrative method for operating the touch screen 106 to receive data from the input device 104 will now be discussed. FIG. 6 is a flow chart illustrating a method 230 for receiving data from the input device 104 through the touch screen 106. The method 230 may begin with operation 232 and the touch screen 106 may be activated. For example, the user may provide one or more touches to the touch screen 106, the electronic device 100 may be turned on or woken from a sleep or idle state, or the like. Once the touch screen 106 is activated, the method 230 may proceed to operation 234 and the touch screen 106 may search for the stylus.

In one embodiment, the touch screen 106 may activate the spectral analyzer 156 which may scan one or more frequencies to detect a signal frequency emitted from the input device 104. For example, with reference to FIG. 4, the spectral analyzer 156 may be in communication with the sense circuitry 150, and thus the sense lines 140. During operation 234, the spectral analyzer 156 may be configured to detect voltage signals transferred to the sense lines 140 and only the sense lines 140 may be scanned, without the drive lines 142 being stimulated or activated.

In some embodiments, the spectral analyzer 156 may scan the sense lines 140 to search for a signal that may be transmitted on any of six frequencies. In other words, the spectral analyzer 156 may perform a spectrum analysis on each of the sense lines 140 to determine if the input device 104 is present. For example, the touch screen 106 may have a range of known input device frequencies and during the spectral analysis may determine whether one or more of these frequencies is present. Because the spectral analyzer 156 may be configured to detect multiple frequencies, the touch screen may be configured to detect an input signal from the input device of substantially any frequency (if within the band of the spectral analysis) from the input device.

Prior to the input device being detected, and while the touch screen is searching for the input device signal, the drive lines 142 may not be driven, that is, no stimulation signal may be applied to the drive lines 142. This may save power, as well as reduce the stylus or input search scanning time. Additionally, in some embodiments, the drive lines may be grounded in order to help shield the sense lines from noise from the display screen or other components.

In embodiments where the touch screen 106 may use spectral analysis to determine if the input device 104 is present, the input device 104 may have a drive duration (e.g., signal transmission time) that may be sufficiently long to be detected between touch scans. In other words, in some embodiments, the input device 104 may drive for a time period that may be longer than twice the period of the spectral analysis scan, plus the length of one touch scan (e.g., time it takes to scan one bank of rows), and some margin. In this manner, the touch of the input device 104 to the touch screen may be able to be detected by the spectral analysis, even if the input device begins driving during a touch scan or half way through a spectral analysis scan. See Table 3 below for a more detailed description regarding the timing requirements for the input device scans.

In another embodiment, the touch screen 106 may activate the drive controller and the sense circuitry 150 to separately scan the drive lines 142 and the sense lines 140, respectively, to detect the input device 104. This type of scanning may be used in operation 242, discussed in more detail below, but may provide an increased resolution with respect to the location of the input device 104 with respect to the touch screen 106. In other words, the horizontal and vertical location of the input device 104 may be known because both the drive lines 142 and the scan lines 140 may be analyzed. It should be noted that in these embodiments, the multiplexers 152, 154 may selectively connect and disconnect the sense lines 140 and/or the drive lines 142 from the stimulation signals and/or circuitry. In this manner, during the scan of the scan lines 140 and the drive lines 142, the tip 122 (if the input device 104 is present) may provide the stimulation signal to the respective lines. This type of scanning will be discussed in more detail below.

If the input device 104 is not present or a signal from the input device 104 is not detected during operation 236, the method 230 may proceed to operation 244, which is discussed in more detail below.

During operation 236, if the input device 104 is present (that is, sufficiently close to the touch screen to cause a signal change in the sense or drive lines) the method 230 may proceed to operation 238. In operation 238 the touch screen 106 may determine whether synchronization with the input device 104 is required. Synchronization may be useful so that the touch screen may be ready to receive data and position information from the input device, as the input device may be master in the communication pathway between the input device and the touch screen. For example, the input device 104 may have started to transmit data during a touch scan (discussed in more detail below) and thus some or all of the signals transmitted from the input device 104 may not be have been detected. In other words, because the communication between the input device 104 and the touch screen 106 may generally be initiated by the input device 104, the touch screen 106 may not be ready to receive an input, e.g., the touch screen 106 may be selectively driving the drive lines 142 to detect changes in capacitance along the sense liens 140 to indicate one or more touches.

If the input device 104 begins transmitting data during a scan for the input device, the touch screen may require less time to achieve synchronization. However, if the input device 104 has already been synchronized with the touch screen, such as in a previous scanning frame, the input device 104 may not have to be synchronized; that is, the input device may not have to be re-synchronized with the touch screen.

Additionally, the touch screen may implement synchronization based on a transmission frequency of the input device 104. For example, the input device 104 may be transmitting at different frequency than the touch screen 106 and/or the input device 104 may change frequencies between transmissions. However, as the touch screen 106 may detect the input device 104 via the spectral analyzer 156 (which may detect a variety of frequencies), the touch screen 106 may be altered to the transmission frequency of input device. Thus, in operation 236, the processor may determine whether the transmission frequency of the input device 104 may be different from the receiving frequencies of touch screen 106 (e.g., through the sense and/or drive circuitry). For example, using data from the spectral analyzer 156, the processor may determine a clearest, strongest, or otherwise desired frequency out of the one or more frequencies transmitted by the input device 104 and select that frequency as the receiving frequency from the input device 104. Note that the input device 104 may transmit on two or more frequencies and/or more change transmission frequencies during, after, or before a transmission.

If synchronization between the touch screen 106 and the input device 104 is required, the method 230 may proceed to operation 240. In operation 240 synchronization between the touch screen 106 and the input device 104 may be established. For example, in instances where the touch screen 106 may need to be synchronized to properly receive the signal from the input device 104, the touch screen 106 may listen to any portion of the data signal it received during the spectral analysis or stylus search. The transmitted signal may indicate a transmission time or length of transmission for the input device 104, and thus the touch screen 106 may vary one or more touch scans, such as by activating a stylus scan, in order to synchronize with the transmission time of the input device. Alternatively or additionally, in instances where the input device 104 may be transmitting at a different frequency from the touch screen 106, the touch screen 106 may configure the drive controller 146 and/or the sense circuitry 150 to be prepared to receive a data signal at the input device frequency.

The touch screen may synchronize with the input device in a variety of manners. In many instances, the touch screen may use phase alignment with respect to the originally transmitted signal from the input device in order to synchronize with the input device. As a specific example, the synchronization may be done by a zero-crossing detection manner. In this example, the touch screen may determine when the input signal (the master signal) may repeat a known and repeatable behavior (such as crossing the zero axis). Once the repeated behavior is known, the touch screen, as the slave device, may then act at a time distance (phase) from the zero crossing, and remaining synchronized to the master signal from the input device. However, it should be noted that many other synchronization techniques known in the art may also be used, and the above examples are meant as illustrative only.

Synchronization between the touch screen 106 and the input device 104 may allow the input device 104 to reduce power usage. This is because the input device 104 may not have transmit a signal constantly, but rather may be stopped or paused during the touch scans. In other words, because the touch screen 106 may vary its touch scans based on the input device 104, the touch scans 106 may be selected to be at blanking intervals of the input device 104 (the device may be programmed with a predetermined transmission time based on the touch screen). Further, this type of synchronization reduces interference by the input device 104 during the touch scans by the touch screen 106 (as the input device 104 my not drive during the touch scans). Moreover, in instances where the input device 104 may use the same transmission frequencies as the touch screen 106, because the input device 104 transmission may be interleaved (discussed in more detail below) between the touch scans.

Once the touch screen 106 and the input device 104 are synchronized, the method 230 may proceed to operation 242. In operation 242, the touch screen 106 may perform a stylus or input device scan. In one embodiment, the touch screen may scan each of the sense lines 140 initially, followed by a scan of each of the drive line 142 (or vice versa). During the stylus scan, neither the sense lines 140 nor the drive lines 142 may be driven. In other words, the drive controller 146 may not apply a stimulation signal to the drive lines 142, e.g., the multiplexer 152 may disconnect the drive lines 142 from the stimulation signal so that the drive lines 142 may detect the data signals transmitted from the input device 104. This is because the input device 104 (via the tip 122 or other electrodes 123, 125) may provide a voltage to the drive lines 142 and/or sense lines 140 in transmitting data.

Timing for the stylus scan operation 242 will be discussed in more detail below with respect to Tables 1-3, but in some instances, the stylus scan may be interleaved between the bank 155 scans. In other words, a first set of drive lines 142 may be driven and the scan lines 140 scanned and then the stylus scan may be activated, which may scan the scan lines 140 and the drive lines 142 separately without either set of line 140, 142 being driven.

Figure 7:
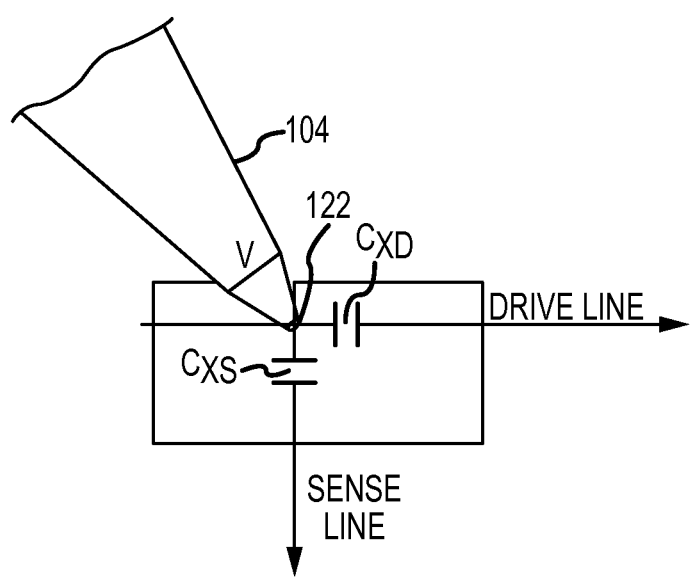
FIG. 7 is an enlarged view of a node of the touch screen in communication with the input device.

During operation 242, as the drive lines 142 and the sense lines 140 are scanned, the method 230 may proceed to operation 244. In operation 244 the touch screen 106 may receive data from the input device 104. For example, the tip 122 may transfer an input signal at one or more frequencies, which may include data regarding the input device, such as the location of the input device 104, outputs from the one or more sensors 126, as well as the angle or orientation of the input device 104. FIG. 7 is an illustrative diagram of the tip 122 of the input device 104 transmitting a voltage to a drive line and a sense line. As shown in FIG. 7, the tip 122 may include a voltage that may be applied to a drive line and a sense line. The voltage signal may be a waveform, such as, but not limited to, sinusoidal, square, trapezoidal, or triangular. Additionally, it should be noted that the voltage signal may be an analog signal and/or may include digital data encoded therein. For example, the voltage signal may include data encoded in the amplitude, phase, frequency, and/or shape. Illustrative embodiments for data transfer from the voltage signal in the tip 122 will be discussed in more detail below. However, with reference to FIG. 7, there may be a tip to drive line capacitance Cxd, a tip to sense line capacitance Cxs, as well as a parasitic capacitance that may be induced between the drive and sense lines. The changes in the Cxd, Cxs, as well as the applied voltage signal may transfer data from the input device 104 through the drive and sense lines to the touch screen 106.

Once the touch screen has received all the data, the method 230 may proceed to operation 246. In operation 246, the touch screen 106 may perform a touch scan and drive one or more rows 153 and/or banks 155 of rows 153, and scan the sense lines 140 for one or more touches on the touch screen 106. After operation 246, the method may proceed back to operation 234 and the touch screen 106 may again search for the stylus. Alternatively, as will be discussed in more detail below, the method 230 may return to operation 242 and the touch screen may scan for the stylus again. As an example, the touch screen 106 may know when the input device is present and accordingly may not need to search for the input device, but may be configured to receive additional data from the input device.

It should be noted that although the method 230 of FIG. 6 is discussed as one-way communication, with the input device 104 transmitting a data signal to the touch screen 106, in other embodiments, the touch screen 106 may also transmit data to the input device. For example, a noise analysis may be done by the touch screen 106 and transmitted through one or more data communication channels (such as by driving a voltage through the drive lines to interact with the tip 122) to alert the input device 104 regarding preferred transmission frequencies, or the like, in order to reduce transmission errors. As one example, time division multiplexing may be used to switch a touch controller of the screen 106 into a transmission mode rather than a listening or receiving mode. As another example, the input device may include another type of receiver that may receive one or more signals from the touch screen. As a specific example, the touch screen may excite or stimulate the drive lines at a predetermined point in time, which may be known by both the input device and the touch screen. The drive excitation or stimulation signal during the predetermined time may include data embedded therein, which may then be received by the input device. Additionally, similar to the input signal, the touch screen may transmit a signal including digital data such as through modulation, or the touch signal may transmit an analog signal (such as, amplitude modulated signal or frequency modulated signal).

Timing Examples for Touch and Input Device Scans

As described above with respect to FIG. 6 and operations 234, 236, and 246, the touch screen 106 may search for the input device 104 (e.g., by analyzing one or more signals from the drive or sense lines through the spectral analyzer 156) between touch scans. In some embodiments, the touch screen 106 may search for the input device 104 between driving one or more banks 155 of rows 153. Table 1 below is an illustrative timing chart providing a schedule for performing a touch scan of the entire touch sensing grid (e.g., all drive and sense lines) while intermittently searching via a spectral analysis for the input device. It should be noted that the "rows" in Table 1 are the drive lines 142 and the "columns" are the sense lines 140; however, in other implementations the drive lines may be the "columns" of the touch screen and the sense lines may be the "rows," in which case the table may be differently configured.

TABLE 1

Timing Chart for Touch Scan While Searching for Input Device

| Scan | Rows Driven | Rows Scanned | Columns Scanned |
| --- | --- | --- | --- |
| Spectral Analysis Scan | None | None | All |
| Touch Scan Bank 0 | 0 to 7 | None | All |
| Spectral Analysis Scan | None | None | All |
| Touch Scan Bank 1 | 7 to 15 | None | All |
| Spectral Analysis Scan | None | None | All |
| Touch Scan - Bank 2 | 16 to 23 | None | All |
| Spectral Analysis Scan | None | None | All |
| Touch Scan - Bank 3 | 24 to 31 | None | All |
| Spectral Analysis Scan | None | None | All |
| Touch Scan - Bank 4 | 32 to 39 | None | All |

The timing illustrated in Table 1 is for instances where the input device 104 may not be present on the touch screen 106 during the touch scan of all the rows (i.e., a touch scan frame). In other words, during the touch scan frame (scan of the entire grid), the input device may not be activated, may be in a sleep or idle mode, or may otherwise not be used to input data to the device 100. Additionally, Table 1 illustrates searching for the input device 104 through a spectral analysis scan by the spectral analyzer 156. As discussed above, in these instances, with reference to FIG. 4, the sense line multiplexer 154 may communicatively connect the spectral analyzer 156 to the sense lines 140. The spectral analyzer 156 may then scan for a received signal on one or more frequencies. In some instances, the transmission frequency of the input device 104 may be known, in which case the touch screen 106 may search for a received signal at that specific frequency and may not scan for multiple frequencies.

With reference to Table 1, the touch screen 106 may first scan for the input device 104 by doing a spectral analysis scan. In this example, each of the sense lines 140 or columns 151 (with reference to FIG. 4), may be scanned, but the drive lines 142 may not be driven nor scanned. As discussed above, this may increase the time required for a stylus scan, as well as conserve power for the computing device.

In the timing example reproduced in Table 1, after the spectral scan, and if the input device 104 is not present, the touch screen 106 may proceed to scan a first bank 155 of rows 153. With reference to FIG. 6, the touch screen may activate operation 246. In one example, a first set of 8 drive lines 142 (e.g., rows numbered 0-7) may be driven. That is, the drive controller 146 may apply a stimulation signal (e.g., voltage) to rows 0-7 (not shown). While the respective drive lines 142 are being stimulated, the sense circuitry 150 may scan each of the scan lines 140. Accordingly, the touch screen 106 may be configured to detect a change in capacitance at a node 144, such as due to a user placing his or finger near or on that node, formed along any of the sense lines 140 with one of the driven lines 142. After the first bank of rows is scanned, the touch screen 106 may again search for the input device 104 by applying a spectral scan, as described above.

As shown in Table 1, the touch screen 106 may interleave scanning for the input device 104 between scanning one or more banks. However, it should be noted that the touch screen 106 may search for the input device 104 after an entire touch scan frame (i.e., after all of the banks have been driven), between two or more groups of banks, and/or after one or more drive lines have been driven. In instances where the touch screen 106 may scan the entire grid prior to search for the input device 104, the user may experience some latency between using the input device and seeing a related output on the touch screen 106. This is because if the touch scan was recently started, any data from the input device 104 may not be received until once the touch scan has been completed and/or may have to be repeated once the touch scan is complete. On the contrary, with the timing schedule illustrated in Table 1, the touch screen 106 may detect the input device 104 shortly after (if not substantially simultaneously) to when the input device 104 first begins transmitting to the touch screen 106. Further, by interleaving the touch scans with the input device scans, the electronic device 100 may be able to not have a significant delay in detecting either touches or inputs from the input device 104.

In instances where the input device 104 may be transmitting data to the touch screen 106, the touch screen 106 may interleave one or more input device scans between the touch scans. This may allow the touch screen 106 to receive both inputs from the input device as well as touch inputs. In other words, a user may not notice a substantial latency (if there is a latency present at all), between inputs from the input device and/or input touches while using touch inputs and the input device substantially simultaneously. Table 2, reproduced below, illustrates an illustrative timing scheduling for interleaving input device scans with touch scans.

It should be noted that in many instances, it may be desirable to scan for the input devices more frequently than touch screen in order to reduce a perceived latency by a user. For example, some input devices, such as a stylus, may move much faster on a screen than a user moving his or her finger (or other touch inputs). Accordingly, by scanning the touch screen for the input device more frequently, such as scanning for the input device at some multiple of the number of touch scans (e.g., twice as many times as scanning for the touch inputs), the user may not perceive a delay in providing an input to the touch screen through the input device. In other words, although the input device may move quicker than user touch, the increased scan frequency may help to reduce an output delay due to the a fast moving tip of the input device (such as a line drawn by the input device that follows with a delay). Rather, because the touch screen may scan more frequently for the input device, a line drawn on the screen by the input device may appear to coming out of the input device directly, as opposed to some delay between movement and output. Therefore, in some embodiments, the input device or stylus scans may be scanned at a "multiple" rate of touch scans. In the example of Table 2, the touch screen may scan for the input device approximately five times more frequently than it scans for touch inputs.

TABLE 2

Timing Chart for Touch Scans Interleaved With Input Device Scans For When The Input Device is Present

| Scan | Rows Driven | Rows Scanned | Columns Scanned |
| --- | --- | --- | --- |
| Spectral Analysis Scan | None | None | All |
| Stylus Row Scan | None | All | None |
| Stylus Col Scan | None | None | All |
| Spectral Analysis Scan | None | None | All |
| Touch Scan - Bank 0 | 0 to 7 | None | All |
| Spectral Analysis Scan | None | None | All |
| Stylus Row Scan | None | All | None |
| Stylus Col Scan | None | None | All |
| Spectral Analysis Scan | None | None | All |
| Touch Scan - Bank 1 | 7 to 15 | None | All |

TABLE 2-continued

Timing Chart for Touch Scans Interleaved With Input
Device Scans For When The Input Device is Present

| Scan | Rows Driven | Rows Scanned | Columns Scanned |
|---|---|---|---|
| Spectral Analysis Scan | None | None | All |
| Stylus Row Scan | None | All | None |
| Stylus Col Scan | None | None | All |
| Spectral Analysis Scan | None | None | All |
| Touch Scan - Bank 2 | 16 to 23 | None | All |
| Spectral Analysis Scan | None | None | All |
| Stylus Row Scan | None | All | None |
| Stylus Col Scan | None | None | All |
| Spectral Analysis Scan | None | None | All |
| Touch Scan - Bank 3 | 24 to 31 | None | All |
| Spectral Analysis Scan | None | None | All |
| Stylus Row Scan | None | All | None |
| Stylus Col Scan | None | None | All |
| Spectral Analysis Scan | None | None | All |
| Touch Scan - Bank 4 | 32 to 39 | None | All |

Generally, the spectral analysis may be done prior to the touch screen performing a touch scan, so that the input device may be detected (if driving or present) prior to a touch scan. In this example, the touch screen may scan in the following order: spectral analysis scan, stylus scan, and then a touch scan. However, other timing charts and/or orders are envisioned as well. Additionally, it should be noted that in some instances, the spectral analysis may be performed in one or two operations. That is, the spectral analysis may have two functions, which may be done in a single scan or multiple scans. The first function of the spectral analysis may be to detect the presence of input device, and the second function may be to determine the best frequencies to use to perform the touch scanning. For example, when the input device is present (see Table 2), the spectral analysis scan before the stylus scan may determine if the stylus is still present, and if the input device is still present, a second spectral analysis may be done after the stylus has been detected. This second spectral analysis, which is done before the touch scan, may determine the clean frequencies that can be used for the touch scans. This second function may not be always necessary and may be performed periodically, but a lower rate (e.g. once per whole frame scan, rather than for each bank).

Moreover, the two functions of the spectral analysis scans may be accomplished in different manners. As an example, the spectral analysis performed before the stylus scan, may be a stylus scan itself. That is, with reference to Table 1, a stylus scan may be performed on the sense axis as a substitute for spectral analysis, and the stylus scan on the sense axis may be used to detect the present of the input device.

With reference to Table 2, the touch screen 106 may alternate between performing touch scans on one or more banks 155 and performing an input device scan (stylus scan) on the columns and/or rows of the touch scan grid. Additionally, as briefly described above, in some embodiments, the input device 104 may vary the signal transmission frequency. Accordingly, as shown in Table 2, in some instances, the touch screen 106 may need to perform a spectral analysis prior to performing a scan for the input device data. However, in other embodiments, the touch screen 106 may perform the spectral analysis when first performing a search for the input device 104 (e.g., after a period of no communication between the two devices) and/or the input device 104 frequency may be constant and thus may not change between inputs. Additionally or alternatively, the spectral analysis may be omitted. For instance, the input device 104 may be detected by the touch screen through a scan of the drive lines and the sense lines, as used to receive data. However in these embodiments, the input device 104 may take longer to detect, as it may require first a scan of the drive lines 142 and a scan of the sense lines 140, whereas the spectral scan may only require a scan of the sense lines 140 to determine if the input device 104 is present.

Referring to Table 2, the touch screen 106 may first perform a spectral analysis scan to detect the frequencies and thus the presence of the input device 104. Once the input device 104 has been detected, the touch screen 106 may scan for the data transmitted from the input device 104. In other words, as described above, with respect to FIG. 6, the drive and scan multiplexers may place the drive and sense lines in stylus mode where they may be configured to receive an input signal from the input device.

In instances where the input device 104 may begin transmitting with the touch screen 106 while the touch screen 106 is performing a touch scan, the touch screen may interrupt one or more bank scans to receive data from the input device. Table 3, shown below, is a timing chart providing an illustrative example of communicating with the input device between touch scans. It should be noted that the time periods listed in Table 3 under the "Duration" column are based on based on a touch screen operating at 60 Hz and an input device operating at 300 Hz, as different operating and transmission frequencies may be used, the time periods listed in Table 3 are illustrative only, and not meant to be limiting.

TABLE 3

Intermittent Input Device Communication with the Touch Screen

| Stylus | Scan | Rows Driven | Rows Scanned | Columns Scanned | Duration |
|---|---|---|---|---|---|
| Not Driving (or not being seen by the touch controller) | Spectral Analysis Scan (6 frequencies) | None | None | All | 400 us |
| Not Driving | Touch Scan - Bank 0 | 0 to 7 | None | All | 2 ms |
| Not Driving | Spectral Analysis Scan (6 frequencies) | None | None | All | 400 us |
| Start Driving | Touch Scan - Bank 1 | 8 to 15 | None | All | 2 ms |
| Driving | Spectral Analysis Scan (6 frequencies) | None | None | All | 400 us |
| Drive | Stylus Row Scan | None | None | All | 250 us |
| Drive | Stylus Col Scan | None | All | None | 250 us |
| Drive and Stop | Spectral Analysis Scan (6 frequencies) | None | None | All | 400 us |
| Not Driving | Touch Scan - Bank 2 or (re-scan of Bank 1) | 16 to 23 | None | All | 2 ms |
| Not Driving | Spectral Analysis Scan (6 frequencies) | None | None | All | 400 us |
| Not Driving | Touch Scan - Bank 3 | 24 to 31 | None | All | 2 ms |
| Start Driving | Spectral Analysis Scan (6 frequencies) | None | None | All | 400 us |
| Drive | Stylus Row Scan | None | None | All | 250 us |
| Drive | Stylus Col Scan | None | All | None | 250 us |

TABLE 3-continued

Intermittent Input Device Communication with the Touch Screen

| Stylus | Scan | Rows Driven | Rows Scanned | Columns Scanned | Duration |
|---|---|---|---|---|---|
| Drive and Stop | Spectral Analysis Scan (6 frequencies) | None | None | All | 400 us |
| Not Driving | Touch Scan - Bank 4 | 32 to 40 | None | All | 2 ms |
| Not Driving | Spectral Analysis Scan (6 frequencies) | None | None | All | 400 us |

With reference to Table 3, in some embodiments, the input device 104 may begin transmitting data to the touch screen 106 during a touch scan. With reference to the timing in Table 3 and the method 230 in FIG. 6, the touch screen 106 may perform a spectral analysis scan (which may cover 6 frequencies). If the input device 104 is not currently driving (for example, not transmitting data to the touch screen 106), the touch screen 106 may not detect the input device 104, and may initiate a touch scan. For example, the touch screen 106 may begin scanning banks 155 by driving one or more drive lines 142 and sensing each of the sense lines 140. After the first bank scan, the touch screen 106 may optionally search for the input device 104 (e.g., operation 234 in FIG. 6). Assuming that the input device 104 is still not detected, the touch screen 106 may transition to the second bank 155 scan and scan a drive a new set of drive lines 142.

As an example, with reference to Table 3, during the touch scan of the next set or rows the input device 104 may begin transmitting. Because the input device 104 may have transmitted some information during the touch scan, which may not have been completely received by the touch screen 106, the touch screen 106 may perform the spectral scan to continue to monitor whether the input device 104 is present on the touch screen. This may help to ensure that the next touch scan has started only after the input device as stopped driving. After the spectral scan, the touch screen 106 may perform an input device or stylus scan and drive the columns and rows (e.g., sense and drive lines) to detect the input signals from the input device 104.

In some embodiments, the touch screen may perform a spectral analysis scan prior to and after a stylus scan. In these embodiments, an increased alignment or synchronization between the input device and the touch screen may be achieved prior to the input device transmitting additional information. However, it should be noted that in some embodiments, the touch scan may perform a spectral scan only prior to the stylus scan.

While the input device 104 is finishing driving, the touch screen 106 may perform an additional spectral analysis scan to determine that the input device 104 has completed transmission. Once the input device has completed transmission, the touch screen 106 may transition to scan the next or third bank of drive lines, or if the scan of the second row bank was sufficiently interrupted by the input device 104 to require a rescan, the touch screen 106 may rescan those rows. For example, in some instances, the input device 104 may transmit input signals at approximately the same frequency as the stimulation signal provided to the drive lines 142. In these instances, if the input device 106 begins transmitting during a bank scan, the touch screen 106 may receive incorrect touch data. As another example, because the touch screen may be the slave to the input device 104, as soon as the input device 104 begins transmitting a signal, the touch screen may activate the input device scan, stopping any touch scans that may be in progress, which may require the affected rows to be rescanned.

After the touch scan, the input device 104, may drive again, providing additional input data to the touch screen 106 and/or may alternative between driving and being idle or otherwise not communicating with the touch screen 106.

As shown in Table 3, in some embodiments, the touch screen 106 may adjust the receiving or listening windows to accommodate the input device. In other words, while the input device is transmitting to the touch screen 106, the touch screen 106 may interleave the stylus scans between touch scans. It should be noted that in some embodiments, the touch screen 106 may alternative between stylus scans (e.g., scans of drive and sense lines) and spectral scans without incorporating any touch scans. For example, the touch screen 106 may be configured continuously search and/or receive data from the input device 104 until the input device 104 is silent for a predetermined number of sub-frames or time period. Alternatively, the touch screen 106 may perform the touch scans during blanking times of the input device 104, e.g., when the input device 104 may not be transmitting information, but may still be touching or otherwise present on the touch screen 106.

It should be noted that in some embodiments, when the input device 104 is in communication with the touch screen 106, the stylus scan rate may be a multiple of the touch scan rate, i.e., as shown in Tables 2 and 3, the stylus scans may be interleaved between the touch scans. Additionally, in embodiments incorporating the timing examples illustrated in Table 3, the input device 104 may have a maximum latency equal to the length of twice the spectral analysis scan time in addition to the time to perform a touch scan on a first row or bank of rows (additionally a margin buffer may be included as well to reduce error). In instances where the input device 104 may be set with this maximum latency, inputs from the input device 104 may be received by the touch screen 106 between touch scans, thus reducing any lag as observed by a user. However, in some instances, the maximum latency for the input device 104 may be configured to a complete touch scan, i.e., the length of time to scan all of the drive lines 142. Additionally, as shown in FIG. 5 operation 210, the maximum latency of the input device 104 may be increased in "first touch" instances. This is because the input device 104 may have to broadcast a single longer before the touch screen is ready to receive the input signal (e.g., if the touch screen is in the middle of a touch scan).

In the embodiment illustrated in Table 3, the input device 104 may be configured to transfer data at a relatively high rate. That is, the input device 104 may transfer data at substantially the same rate the touch screen 106 may be scanning for the input device 104. In this manner, data transferred by the input device 104 may be repeated within one touch scan frame to help ensure correct transmission.

Illustrative Embodiments of the System

As briefly discussed above with respect to FIG. 7, in some instances, the input device 104 may transfer data to the touch screen 106 through one or more analog or digital signals. The following discussion relates to circuit schematic diagrams that provide illustrative implementations of the touch screen, input device, and communication mechanism between the two. It should be noted that the circuit schematic diagrams are example implementations only, and many other implementations are envisioned, thus the below discussion is meant as illustrative only.

Figure 8A:
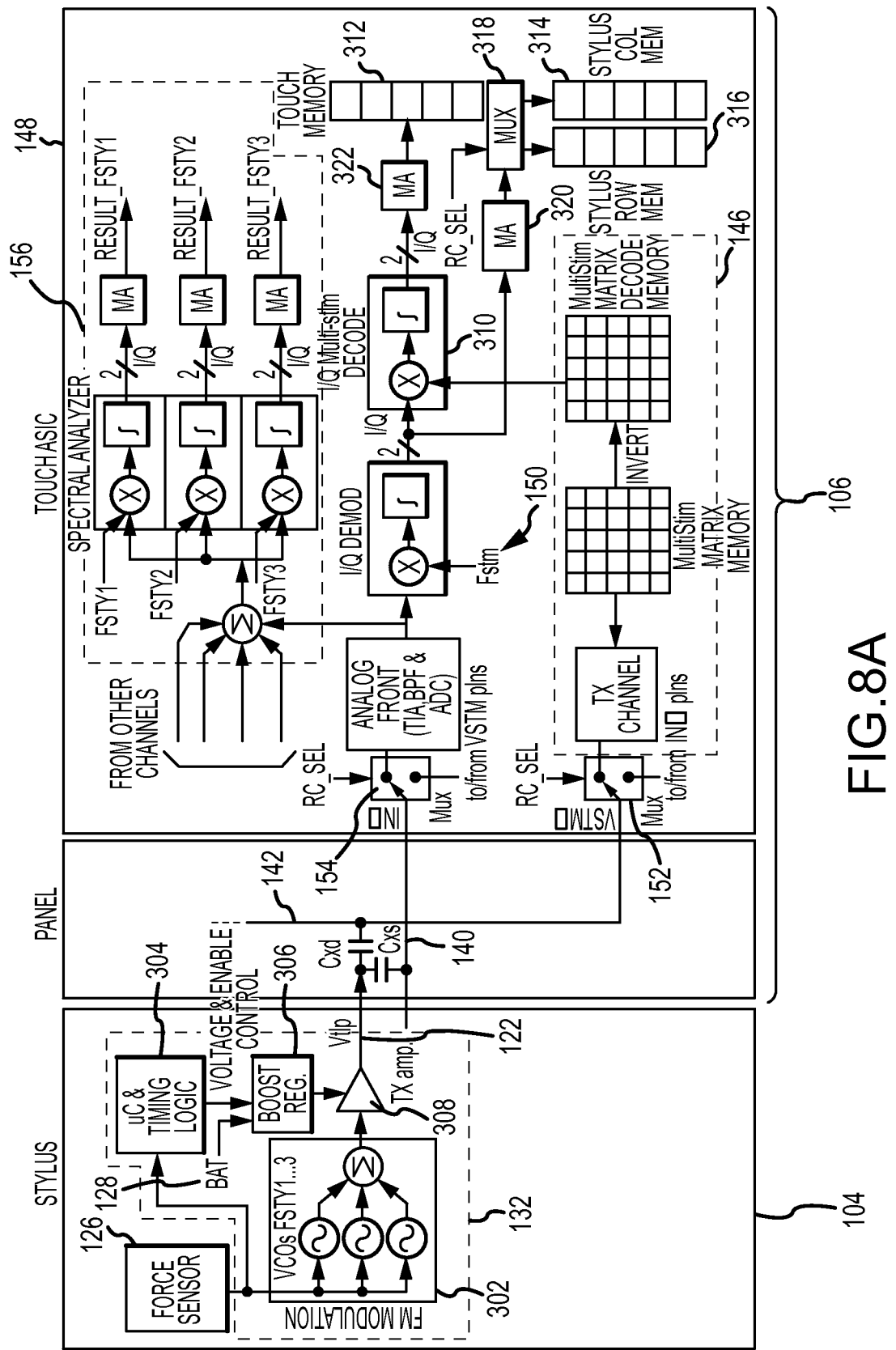
FIG. 8A is a schematic of an illustrative implementation of the input device and the touch screen.

In some embodiments, the input device 104 may transfer data to the touch screen 106 by varying the frequency (frequency modulation or FM) of the voltage signal transferred from the tip 122 to the drive and sense lines. FIG. 8A is a schematic of an illustrative implementation of the input device 104 and the touch screen 106. As shown in FIG. 8A, the touch screen 106 is in a scanning period for the input device 104, and thus the spectral analyzer 156 is in communication with the sense lines 140. With reference to FIG. 8A, in this implementation, the input device 104 may include a frequency modulation component 302 that may combine multiple signal having varying frequencies. These signals may be transmitted sequentially or simultaneously. For example, the modulation component 302 may use three separate signals to create redundancy for a single signal. In other words, by sending the same sensor data at two, three, or more frequencies, the touch controller may determine which of the three signals has a higher signal to noise ratio (SNR) and use that frequency to receive data from the input device. This same idea may also be used for phase modulation. For example, the same data may be transmitted with relative phase shifts multiple times (either at the same time or sequentially), and the touch controller may determine which phase to use. Alternatively, the modulation component may combine three or more separate signals, such as a signal from the sensor 126, the power source 128 (e.g., battery status), or the like into a single voltage signal having varying frequencies.

Additionally, the input device 104 may include a timing logic components 304 that may control any clock signals and/or other timing elements for the input device 104, a transmit amplifier that can amplify the signals from block 132, and a boost regulator 306 to generate the supply voltage for the transmit amplifier. In this embodiment, data may be encoded into the voltage signal transmitted from the tip 122 by changing the frequency and/or the number of changes in the frequency over the length of the transmission signal.

With continued reference to FIG. 8A, the touch screen 106 may include the grid of sense lines 140 and data lines 142, as well as the touch controller or processor 148 element. The touch controller 148 may include the two input data multiplexers 152, 154, the sense circuitry 150, the spectral analyzer 156, and/or the drive controller or circuitry 146. The touch controller 148 may further include one or more decoders 310, memory components 312, 314, 316, one or more demodulators (such as an I/O demodulator and subsequent multi-stim demodulator), as well as any additional components. Demodulators may be comprised of multipliers and accumulators 320, 322.

With reference to FIG. 8A, in instances where the spectral analyzer 156 may be used to analyze the sense lines 140 and/or drive lines 142 for the input device 104, the sense line multiplexer 154 may communicatively couple the spectral analyzer 156 to the sense lines 140 (e.g., by changing one or more switches). During a spectral analysis, the spectral analyzer 156 may analyze the frequency response of the sense signals and/or may compare the signals to known frequencies in order to detect if the input data signal is present and/or detect the one or more main frequency components of the input device 104. For example, the data signal from the tip 122 may be transferred to the sense lines 140, which may be connected to the sense circuitry 150. In one illustrative embodiment, the AFE can include a trans-impedance amplifier (TIA), a band-pass filter (BPF), and one or more analog to digital converters (ADC). The sense circuitry 150 may then provide the data signal to the spectral analyzer, as well as to a demodulator.

As shown in FIG. 8A, the drive controller 146 may include a transmit channel, as well as one or more grid or matrix memory components. The drive controller 146 may be in communication with a decoder 310, which may receive one or more signals from the sense circuitry 150. The vector demodulator 310 comprised of the I/O demodulator and the multi-stim demodulator can demodulate digitized sense signals from the AFE 146 to generate in-phase (I) and quadrature (Q) components representative of the received sense signals. The MAG block can calculate magnitude from the I/O results and post magnitude results to one or more memory components 312, 413, 316. For example, one relationship, expressed mathematically is reproduced below.

$$MAG=\sqrt{I^2+Q^2}$$

The decoder 310 may transform signals from the sense circuitry 150 and the drive controller 146 to one or more memory components 312, 413, 316 and/or MAG (multiply and accumulate) components 320, 322. Further, it should be noted that there may be a memory component for the input device, such as a row memory 314 and a column memory 314, as well as a memory component for the touch screen 106 (which may include node information for touches). This may allow the touch controller 148 to store select data regarding the input device 104 and/or the touch screen 106 to provide to other components of the electronic device 100, and/or to use in processing one or more instructions for the touch screen 106.

When the touch screen 106 may be in a touch scan mode, the sense multiplexer 154 and the drive multiplexer 152 may communicatively couple the sense lines 140 and drive lines 142, respectively, to the touch scanning components. That is, the sense lines 140 may be in communication with the sense circuitry 150 and the drive lines 142 may be connected to the stimulation signals transmitted from the drive controller 146. During a touch scan, select drive lines 142 (i.e., one or more rows) may be provided with a stimulation signal and each of the sense lines 140 may be monitored by the sense circuitry 150 for changes in capacitance. It should be noted that generally the sense signal may be received from the sense channel, and the sense channel may be communicatively coupled to the drive lines through one of the multiplexers.

Figure 8B:
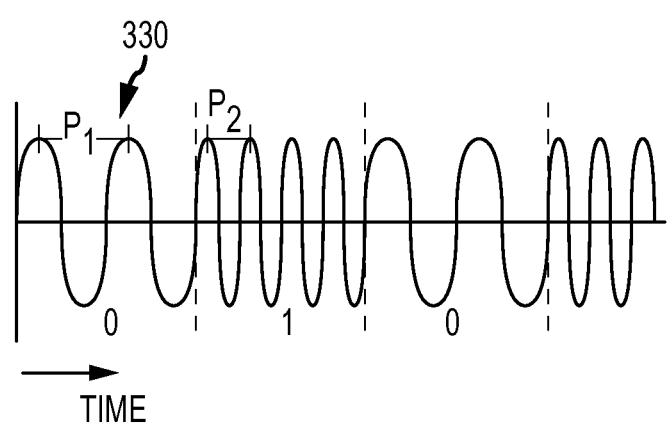
FIG. 8B is a diagram of a sample sinusoidal waveform encoded by frequency modulation.

Using the implementation in FIG. 8A, the input device 104 may transmit data in the form of a voltage signal to the touch screen 106. The voltage signal may be encoded with one or more changes in frequency that may each represent data. FIG. 8B is a diagram of a sample sinusoidal waveform encoded by frequency modulation. However, it should be noted that other types of waveforms may be used as the carrier wave for the data. With reference to FIG. 8B, digital data, such as readings from one or more sensors 126, may be represented by two different frequencies of the carrier wave. For example, a first portion of the sine wave 330 may have a period P1 and a second portion may have a period P2, such that during a first time period, the sine wave 330 may have a first frequency of 1/P1 and during a second time period the sine wave 330 may have a second frequency of 1/P2. In this instance, the first frequency may represent a digital 0 and the second frequency may represent a digital 1. Additionally, in some instances, the I/O demodulator may also demodulate the binary data encoded on the received sense signal and post decoded binary data to a separate dedicated memory readable by the touch processor.

Figure 9A:
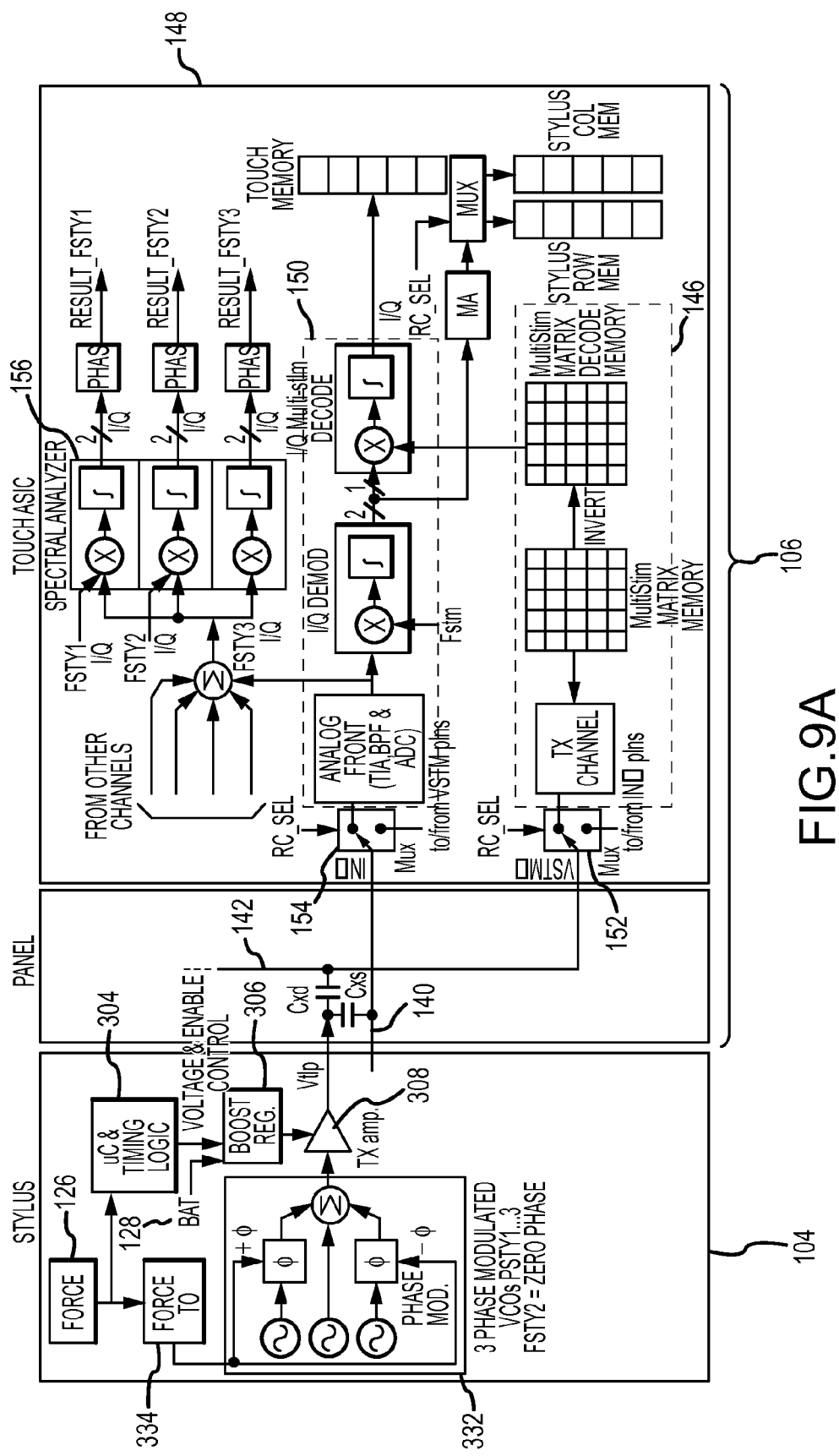
FIG. 9A is an illustrative circuit schematic diagram of an implementation of the touch screen for receiving data through phase modulation.

As another implementation, the input device 104 may encode digital data as phase changes in the signal transmitted from the tip 122 to the touch screen 106. FIG. 9A is an illustrative circuit schematic diagram of an implementation of the touch screen for receiving data through phase modulation. In this implementation, which may be substantially similar to the implementation in FIG. 8A; however, in this implementation, the input device 104 may include a phase modulator 332 rather than the frequency modulator. The input device 104 may further include a converter component 334 for converting a signal from the one or more sensors 126 into a desired signal for transmission. Additionally, as the transmitted signal may be encoded with phase changes, the spectral analyzer 156 may output a phase signal rather than a modulated amplitude signal, such as in FIG. 8A. As shown in FIG. 8A, the spectral analyzer outputs two components. The "I" components and the "Q" component, the square root of $(I^2 + Q^2)$ is the amplitude of the input signal while the inverse tangent of Q/I is the phase of the input signal. Generally, the spectral analyzer detects the presence of the input device and its frequency, and so analysis of the signal from the spectral analyzer may not be required. In other words, demodulation of data (and position) may be performed by the main sensing channel, more specifically by the first I/Q demodulator in 150. Although, in some embodiments, other analysis components may be used.

Figure 9B:
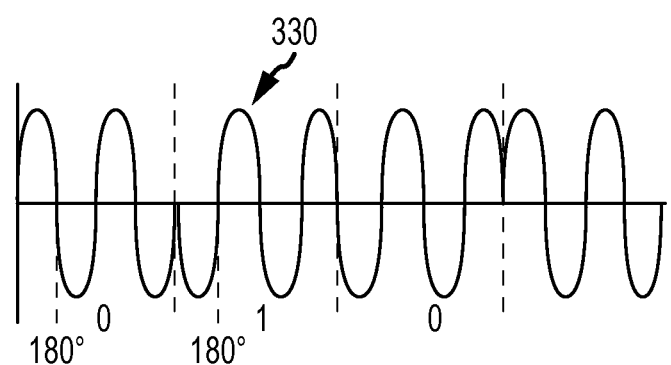
FIG. 9B is a diagram of a sample sinusoidal waveform encoded with data by phase shifting.

As can been seen in the circuitry diagram of the phase modulator 332, a phase change may be applied to one or more portions of the transmission or data signal. FIG. 9B is a diagram of a sample sinusoidal waveform encoded with data by phase shifting. With reference to FIG. 9B, using phase shifting, the digital data may be represented by different phases or phase shifts of the carrier wave. For example, a sine wave 330 may, during a predetermined time period, have a first portion with a first phase, and a second portion with a second phase that is shifted (e.g., either 90° or 180°) from the first phase. In this manner, the portion of the sine wave 330 having the first phase may represent a digital 0 and the second portion of the sine wave 330 shifted from the first portion may represent a digital 1.

It should be noted that substantially any type of phase shifting may be used to transfer data from the input device 104 to the touch screen 106. For example, binary phase-shift keying (BPSL), quadrature phase shift keying (QPSK), eight phase shift keying (8PSK), and/or differential phase shift keying (DPSK) may each be used to transfer data. The type of modulation may be varied depending on the touch scan and/or stylus scan rates, as well as the amount of data that may be desired to be transmitted.

It should be noted that in other embodiments, the data signal from the input device 104 may be otherwise encoded with digital data. For example, the data signal may be encoded through amplitude modulation, angle modulation (varying an angle of the carrier wave), or the like. In these instances, the touch screen and/or the input device may be differently configured, as desired. Further, shift keying, such as amplitude and/or frequency shift keying may further be used to transfer data to and from the input device and the touch screen.

Eraser and Tilt Implementations

As described above with respect to FIG. 2, the input device 104 may include one or more transmission components, such as electrodes, that may be used to transmit additional data to the touch screen 106. For example, the input device 104 may include the tilt electrode 123 and/or the eraser electrode 125. In these instances, the input device 104 may transmit data from the one or more sensors 126 and/or other components of the input device 104 while being held in different orientations with respect to the touch screen 106, and these different orientations may be transmitted as additional data to the touch screen 106.

With respect to the eraser electrode 125, the eraser electrode 125 may provide a data signal similar to the data signal provided by the tip 122. However, the eraser electrode 125 may provide a signal that may be distinguished from the tip signal. As one example, the signal from the eraser electrode 125 may be phase shifted from the signal from the tip 122, such that the eraser electrode 125 may transmit a signal that is shifted by a 180 degrees from the signal transmitted by the tip 122. As another example, the signal may include a data bit encoded therein, and the data bit may indicate whether the signal is transmitted from the tip 122 or the eraser 125. In this manner, the touch screen 106 may recognize that the input device 104 is being oriented with its bottom end surface facing the touch screen 106. This may be used to activate one or more different applications or commands, e.g., when oriented in this manner the input device 104 may "erase" information displayed on the touch screen 106. As another example, the electrode may be used to change a color of text displayed on the touch screen 106, a width of a line, or the like.

In some embodiments, the eraser electrode 125 may be phase shifted from the data signal transmitted by the tip 122. As a specific example, the eraser electrode 125 may transmit a signal that may be 180 degrees shifted from the tip 122 signal. Thus, the phase shift may alert the touch screen 106 that the transmitted data may correspond to the eraser and not the tip of the input device 104.

As another example, the tilt electrode 123 may transmit a signal that may indicate an angular orientation of the input device 104 relative to the touch screen 106. As one example, the tilt electrode 123 may apply a signal to the touch screen 106 that may be offset or otherwise distinguished from the tip 122 signal to indicate the orientation of the input device 104. As another example, the tilt electrode 123 may interact with a different node 144 to provide a different signal to a drive line 142 and/or a sense line 140, and the relative location of the signal at the second node 144 may indicate to the touch screen 106 the orientation of the input device 104. For example, in instances where the tilt electrode 123 may be positioned on a side of the body of the input device, if the input device 104 is angled relative to the touch screen, and the tilt reflection on the touch screen (that is, the position of the input device as seen by the touch screen is known), the touch screen may use the known distance of the tilt electrode to the tip 122 of the input device to determine the tilt of the input device itself. For example, the angle of the input device may be calculated by determining the inverse cosine of the distance between tip and tilt on the input device divided by the distance between tip and tilt on the screen.

CONCLUSION

The foregoing description has broad application. For example, while examples disclosed herein may focus on input devices, it should be appreciated that the concepts disclosed herein may equally apply to substantially any other type of communication between electronic devices. Similarly, although the input device and receiving unit may be discussed with touch screens, the devices and techniques disclosed herein are equally applicable to other types of capacitive coupling systems. Accordingly, the discussion of any embodiment is meant only to be exemplary and is not intended to suggest that the scope of the disclosure, including the claims, is limited to these examples.

What is claimed is:

1. A computing device configured to communicate with an input device comprising:
   a processor;
   a touch interface in communication with the processor and configured to detect an input signal corresponding to an object approaching or contacting a surface, the touch interface including a plurality of sense lines and a plurality of drive lines; wherein the touch interface performs a searching scan to search for the input device;

during a first scan the touch interface drives at least one of the plurality of drive lines and scans at least one of the plurality of sense lines, wherein the first scan is performed after the searching scan;

during a set of second scans the touch interface scans at least one of the plurality of sense lines and at least one of the plurality of drive lines, wherein the second scans are performed after the first scan; and while receiving a data signal from the input device, the touch interface interleaves the first scan and the second scans.

2. The computing device of claim 1, wherein the second scans further include a scan of the plurality of sense lines and the plurality of drive lines, wherein the plurality of drive lines are scanned separately from the sense lines.

3. The computing device of claim 1, wherein the searching scan analyzes a spectrum of frequencies to detect the data signal from the input device.

4. The computing device of claim 3, wherein the searching scan further detects a position of the input device if a data signal is received during the searching scan.

5. The computing device of claim 1, wherein the touch interface further comprises a transmission medium positioned between the plurality of drive lines and the plurality of sense lines; and a sensing circuit in communication with the plurality of sense lines and configured to detect a signal change on the plurality of sense lines.

6. The computing device of claim 1, wherein the data signal of the input device corresponds to at least one sensor within the input device.

7. The computing device of claim 6, wherein the at least one sensor is one of an accelerometer, a gyroscope, a force sensor, a pressure sensor, or a temperature sensor.

8. A method for receiving data from an input device to a computing device through a touch interface comprising:

scanning the touch interface for a presence of an input device;

detecting the input device;

scanning the touch interface for a touch input during a first scan by applying a stimulation signal to at least one drive line and analyzing at least one sense line of the touch interface, wherein scanning the touch interface for the touch input is performed after scanning the touch interface for the presence of an input device;

synchronizing with the input device by receiving a position signal and activating a second scan of the touch interface; and receiving a data signal from the input device during the second scan through the at least one sense line or the at least one drive line of the touch interface.

9. The method of claim 8, wherein when the input device is detected while the touch interface is applying the stimulation signal to at least one drive line, the method further comprising rescanning the touch interface by applying the stimulation signal to the at least one drive line and analyzing the at least one sense line.

10. The method of claim 8, wherein detecting the input device further includes detecting a plurality of frequencies of the data signal as the data signal is applied to one of the at least one drive line or one of the at least one sense line, and selecting a frequency from the plurality of frequencies, wherein the selected frequency is the cleanest frequency of the plurality of frequencies.

11. The method of claim 8, wherein detecting the input device further includes detecting a frequency of the data signal applied to one of the least one drive line or one of the least one sense line.

12. The method of claim 11, wherein at least four frequencies are scanned to detect the frequency of the data signal.

13. The method of claim 8, wherein the at least one drive line includes a plurality of drive lines and the at least one sense line includes a plurality of sense lines.

14. The method of claim 13, wherein scanning the touch interface for a touch input further includes applying the stimulation signal to a bank of drive lines; and analyzing each of the plurality of sense lines.

15. A method for transmitting data from an input device to a capacitive sensing grid of a computing device, comprising:

receiving a user input;

transitioning the input device from an idle state to an active state when the user input exceeds a predetermined threshold;

transmitting current data to the capacitive sensing grid through a tip of the input device; and when a previous data transmission occurred a predetermined time period before transmitting current data to the capacitive sensing grid, extending a time period for the current data transmission.

16. The method of claim 15, wherein the transmission data includes a position signal and a sensor signal.

17. The method of claim 15, wherein the user input is a user force, and the predetermined threshold is a force level of a force exerted on the tip.

18. The method of claim 15, wherein the input device is a stylus.

19. The method of claim 15, wherein the tip is an electrode and is configured to stimulate at least one portion of the capacitive sensing grid.

* * * * *